(12) United States Patent
Zhang

(10) Patent No.: US 9,348,493 B2
(45) Date of Patent: May 24, 2016

(54) AUTOMATED SUBSCRIBER-BASED CUSTOMIZATION OF ELECTRONIC CHANNELS FOR CONTENT PRESENTATION

(71) Applicant: Jack Ke Zhang, Ijamsville, MD (US)

(72) Inventor: Jack Ke Zhang, Ijamsville, MD (US)

(*) Notice: Subject to any disclaimer, the term of this patent is extended or adjusted under 35 U.S.C. 154(b) by 0 days.

(21) Appl. No.: 14/276,721

(22) Filed: May 13, 2014

(65) Prior Publication Data

US 2015/0331583 A1  Nov. 19, 2015

(51) Int. Cl.
*G06F 3/0484* (2013.01)

(52) U.S. Cl.
CPC .......... *G06F 3/04842* (2013.01); *G06F 3/0484* (2013.01)

(58) Field of Classification Search
CPC ... G06F 3/0482; G06F 3/0481; G06F 9/4443; G06F 3/0489; H04N 5/44543
USPC ........................................................ 715/825
See application file for complete search history.

(56) References Cited

U.S. PATENT DOCUMENTS

| | | | |
|---|---|---|---|
| 5,585,866 A * | 12/1996 | Miller et al. ..................... 725/43 |
| 6,208,996 B1 * | 3/2001 | Ben-Shachar et al. |
| 6,341,316 B1 * | 1/2002 | Kloba ............... G06F 17/30902 707/E17.12 |
| 6,694,316 B1 | 2/2004 | Langseth et al. |
| 6,774,926 B1 * | 8/2004 | Ellis et al. .................. 348/14.01 |
| 6,959,319 B1 * | 10/2005 | Huang et al. .................. 709/203 |
| 7,177,859 B2 * | 2/2007 | Pather et al. |
| 7,302,643 B1 * | 11/2007 | Edlund ............ G06Q 10/06314 715/703 |
| 7,596,797 B1 * | 9/2009 | Kapner et al. .................. 725/46 |
| 7,698,276 B2 * | 4/2010 | Seshadri et al. .............. 719/318 |
| 7,711,782 B2 * | 5/2010 | Kim et al. ...................... 709/206 |
| 7,787,818 B2 * | 8/2010 | Shapiro et al. ............... 455/3.01 |
| 7,797,306 B1 * | 9/2010 | Pather et al. ................... 707/714 |
| 7,831,670 B2 * | 11/2010 | Goodman et al. ............. 709/206 |
| 7,869,941 B2 * | 1/2011 | Coughlin et al. ............. 701/533 |
| 7,890,572 B2 * | 2/2011 | Goodman et al. ............. 709/203 |
| 8,131,733 B2 | 3/2012 | Wang |
| 8,402,495 B1 * | 3/2013 | Chang .................... H04H 60/06 725/93 |
| 8,473,572 B1 * | 6/2013 | Austin-Lane .......... G06Q 30/02 709/203 |
| 8,504,404 B2 * | 8/2013 | Norton ......................... 705/7.19 |
| 8,612,881 B2 | 12/2013 | Kim et al. |
| 8,650,083 B2 * | 2/2014 | Doughty ............ G06Q 30/0269 705/14.49 |
| 8,671,214 B2 | 3/2014 | Lockhart et al. |

(Continued)

OTHER PUBLICATIONS

International Search Report and Written Opinion of the International Searching Authority, for International Application No. PCT/US2014/035257 mailed on Sep. 22, 2014, 9 pages.

(Continued)

*Primary Examiner* — Jung-Mu Chuang
(74) *Attorney, Agent, or Firm* — Kilpatrick Townsend & Stockton LLP

(57) ABSTRACT

Methods and systems can provide custom electronic-channel content items to display when a device is in display state. It can be determined that a user device is subscribed to receive content items corresponding to a channel and to present one or more of the content items when the user device is in a display state. Data corresponding to the user device can be identified. The data can correspond to a physical or electronic action (e.g., an interaction with a presented content item or a purchase at a channel-associated virtual or physical store). A customization rule for the channel can be identified. A content item can be generated or selected using the customization rule and the data. It can be enabled for the content item to be presented on the user device when the user device is in the display state.

20 Claims, 11 Drawing Sheets

(56) References Cited

U.S. PATENT DOCUMENTS

| | | | |
|---|---|---|---|
| 8,712,810 B2* | 4/2014 | Meisels et al. ............... 705/5 |
| 8,738,723 B1* | 5/2014 | Faaborg et al. ............ 709/207 |
| 8,799,952 B2* | 8/2014 | Gossweiler et al. ........... 725/44 |
| 8,825,362 B2* | 9/2014 | Kirsch ....................... 701/430 |
| 8,850,453 B1* | 9/2014 | Zhang et al. ................ 719/313 |
| 8,850,490 B1* | 9/2014 | Thomas et al. ............... 725/61 |
| 9,182,889 B1* | 11/2015 | Karlo .................. G06F 3/0482 |
| 2002/0007485 A1 | 1/2002 | Rodriguez et al. |
| 2002/0023002 A1 | 2/2002 | Staehelin |
| 2002/0026349 A1* | 2/2002 | Reilly et al. .................... 705/14 |
| 2002/0069119 A1* | 6/2002 | Rogatinsky .................... 705/26 |
| 2002/0090934 A1* | 7/2002 | Mitchelmore ............... 455/412 |
| 2003/0018724 A1* | 1/2003 | Mathewson et al. .......... 709/206 |
| 2003/0046283 A1 | 3/2003 | Roberts |
| 2003/0069940 A1* | 4/2003 | Kavacheri et al. ............ 709/217 |
| 2003/0084449 A1 | 5/2003 | Chane et al. |
| 2004/0064351 A1* | 4/2004 | Mikurak .......................... 705/7 |
| 2004/0143472 A1 | 7/2004 | Estrada et al. |
| 2004/0158858 A1 | 8/2004 | Paxton et al. |
| 2005/0027631 A1* | 2/2005 | McAtee ......................... 705/36 |
| 2005/0041667 A1* | 2/2005 | Miller et al. ............... 370/395.4 |
| 2005/0273499 A1* | 12/2005 | Goodman et al. ............ 709/206 |
| 2006/0026088 A1* | 2/2006 | Grossman et al. .............. 705/37 |
| 2006/0123455 A1* | 6/2006 | Pai et al. ...................... 725/133 |
| 2006/0235885 A1* | 10/2006 | Steele et al. ............... 707/104.1 |
| 2007/0067373 A1* | 3/2007 | Higgins ............... G06F 11/3013 |
| 2007/0088801 A1* | 4/2007 | Levkovitz et al. ............. 709/217 |
| 2007/0105533 A1* | 5/2007 | Chiu et al. .................. 455/412.2 |
| 2007/0124769 A1* | 5/2007 | Casey et al. ..................... 725/46 |
| 2007/0178889 A1* | 8/2007 | Cortegiano et al. ......... 455/414.3 |
| 2008/0052162 A1* | 2/2008 | Wood .............................. 705/14 |
| 2008/0052742 A1* | 2/2008 | Kopf ................... H04N 5/44591 725/34 |
| 2008/0207263 A1* | 8/2008 | May et al. ................... 455/556.2 |
| 2008/0242221 A1* | 10/2008 | Shapiro ................. G06Q 30/02 455/3.06 |
| 2008/0263472 A1* | 10/2008 | Thukral et al. ................ 715/774 |
| 2008/0275741 A1* | 11/2008 | Loeffen ............................ 705/5 |
| 2008/0294631 A1 | 11/2008 | Malhas et al. |
| 2008/0319828 A1* | 12/2008 | Southam .......... G06Q 10/06315 705/7.25 |
| 2008/0319871 A1* | 12/2008 | Thomas et al. ................ 705/26 |
| 2009/0063239 A1* | 3/2009 | Baron et al. ...................... 705/9 |
| 2009/0204904 A1* | 8/2009 | Mujkic et al. ................. 715/753 |
| 2009/0228938 A1* | 9/2009 | White et al. ..................... 725/87 |
| 2010/0202450 A1* | 8/2010 | Ansari et al. .................. 370/389 |
| 2011/0099036 A1 | 4/2011 | Sarkissian et al. |
| 2011/0209174 A1 | 8/2011 | Kikinis et al. |
| 2011/0314115 A1* | 12/2011 | Nagaraj ........................ 709/206 |
| 2011/0321072 A1* | 12/2011 | Patterson et al. ................ 725/5 |
| 2012/0005019 A1* | 1/2012 | LeBlanc et al. ............ 705/14.53 |
| 2012/0011536 A1* | 1/2012 | Wang et al. ..................... 725/27 |
| 2012/0054278 A1* | 3/2012 | Taleb ..................... G06Q 50/01 709/204 |
| 2012/0116877 A1 | 5/2012 | Schupp et al. |
| 2012/0136572 A1* | 5/2012 | Norton .......................... 701/465 |
| 2012/0265621 A1 | 10/2012 | Sechrist et al. |
| 2012/0266076 A1 | 10/2012 | Lockhart et al. |
| 2012/0284637 A1* | 11/2012 | Boyer et al. .................. 715/751 |
| 2013/0013409 A1 | 1/2013 | Walmer |
| 2013/0124189 A1* | 5/2013 | Baldwin .......................... 704/9 |
| 2013/0132750 A1* | 5/2013 | Werner et al. ................ 713/323 |
| 2013/0173796 A1* | 7/2013 | Grab et al. .................... 709/225 |
| 2013/0210493 A1 | 8/2013 | Tal et al. |
| 2013/0232553 A1* | 9/2013 | Tomfohrde et al. ............... 726/4 |
| 2013/0237144 A1* | 9/2013 | Lee et al. ..................... 455/3.01 |
| 2013/0238735 A1* | 9/2013 | Salonen ........................ 709/206 |
| 2013/0315041 A1* | 11/2013 | Hiremath et al. ............... 368/10 |
| 2013/0346408 A1* | 12/2013 | Duarte ............. G06F 17/30598 707/737 |
| 2014/0046715 A1 | 2/2014 | Lau et al. |
| 2014/0108968 A1 | 4/2014 | Vishria |
| 2014/0207603 A1* | 7/2014 | Orenstein et al. ............ 705/26.1 |
| 2014/0215350 A1* | 7/2014 | Kosslyn ............. G06F 17/30035 715/745 |
| 2014/0249926 A1 | 9/2014 | Wallace et al. |
| 2014/0250465 A1 | 9/2014 | Mulholland et al. |
| 2014/0278489 A1 | 9/2014 | Navani et al. |
| 2014/0282003 A1* | 9/2014 | Gruber ...................... G06F 3/16 715/727 |
| 2014/0337139 A1* | 11/2014 | Thomas ............ G06Q 30/0269 705/14.66 |
| 2015/0058059 A1* | 2/2015 | Kahan ................ G06Q 10/1095 705/7.19 |
| 2015/0074259 A1* | 3/2015 | Ansari et al. .................. 709/224 |
| 2015/0134343 A1* | 5/2015 | Kluger ................ G06F 3/04842 705/2 |
| 2015/0149305 A1 | 5/2015 | Zhang |
| 2015/0149544 A1 | 5/2015 | Zhang |
| 2015/0149585 A1 | 5/2015 | Zhang |
| 2015/0356515 A1* | 12/2015 | Chappell ............. G06Q 10/109 705/7.19 |

OTHER PUBLICATIONS

Non-final Office Action mailed Feb. 11, 2014 for U.S. Appl. No. 14/101,056, filed Dec. 9, 2013, all pages.
Final Office Action mailed May 23, 2014 for U.S. Appl. No. 14/101,056, filed Dec. 9, 2013, all pages.
Non-Final Office Action mailed Oct. 8, 2014 for U.S. Appl. No. 14/101,056, filed Dec. 9, 2013, all pages.
Final Office Action mailed Jan. 22, 2015 for U.S. Appl. No. 14/101,056, filed Dec. 9, 2013, all pages.
International Search Report and Written Opinion mailed Nov. 14, 2014 for International Patent Application No. PCT/US2014/035255, all pages.
*Desktop Alert Software On-Line Demo.* Deskalerts, Nov. 2, 2013. Web. Retrieved from https://webarchive.org/web/*/http://www.alert-software.com/demo on Feb. 6, 2014, 4 pages.
*Player.* netpresenter, Oct. 31, 2013. Web. Retrieved from https://web.archive.org/web/*/http://www/netpresenter.com/products/player on Feb. 5, 2014, 4 pages.
*Desktop Internal Communications.* SnapComms, Nov. 6, 2013. Web. Retrieved from https://web.archive.org/web/20130501000000*/http://www.snapcomms.com on Feb. 5, 2014, 4 pages.
U.S. Appl. No. 14/101,103, filed Dec. 9, 2013, all pages.
U.S. Appl. No. 14/101,056, filed Dec. 9, 2013, all pages.
Non-final Office Action mailed Jan. 6, 2015 for U.S. Appl. No. 14/256,785, filed Apr. 18, 2014, all pages.
U.S. Appl. No. 14/256,785, filed Apr. 18, 2014, 122 pages.
First Action Interview Pilot Program Pre-Interview Communication of Jun. 20, 2014 for U.S. Appl. No. 14/256,785, 6 pages.
First Action Interview Office Action Summary of Aug. 6, 2014 for U.S. Appl. No. 14/256,785, 7 pages.
Non-final Office Action mailed Jul. 1, 2015 for U.S. Appl. No. 14/101,103, filed Dec. 9, 2013, 19 pages.
Final Office Action mailed Jul. 20, 2015 for U.S. Appl. No. 14/256,785, filed Apr. 18, 2014, 22 pages.
Non-final Office Action mailed Jul. 20, 2015 for U.S. Appl. No. 14/101,056, filed Dec. 9, 2013, 38 pages.

* cited by examiner

AUTOMATED SUBSCRIBER-BASED CUSTOMIZATION OF ELECTRONIC CHANNELS FOR CONTENT PRESENTATION

BACKGROUND

A wealth of information is now available to users via the Internet and other communication tools. Some information requires users to actively search for the content before it is presented. Other information (e.g., advertisements) is presented without a user request, but user interest in such information can be limited.

SUMMARY

In some embodiments, techniques can provide allow publishers to define and manage individual electronic channels. For each channel, the publisher can upload or otherwise define a set of content items. The publisher can further set rules as to how content items are to be selected for presentation (amongst the set of content items) and/or how they are to be presented (e.g., a presentation duration). In some instances, these rules can include user-specific factors. For example, selection of a content item for presentation can depend on a user's location, preferences, purchase history, calendar and/or other channel subscriptions. In some instances, a content item itself is defined in a user-specific manner based on a user characteristic. For example, a discount amount or applicability or displayed text can be determined for a particular user, and a custom content item can be generated to include the determined information. A publisher can associate each content item with a destination (e.g., a URL), such that detection of a particular user action (e.g., mouse click or key stroke) can cause a device of the user to be directed to the destination.

A user can select one or more channels to subscribe to. Such subscriptions can cause one or more devices associated with the user to receive content items for the selected channels. A user device can enter a display state, for example, upon detection of particular user input, detection of passage of an inactivity threshold (e.g., not having received user input for a defined period of time), detection of an application action (e.g., a termination of a phone call or end of a television show), and so on. During the display state, content items associated with the subscribed channels can be presented. For example, content items can be sequentially presented in a substantially full-screen manner. In some instances, content items displayed during a display state are exclusive to the subscribed channels. In other instances, additional content items are displayed and/or one or more default subscriptions are added to a user's subscription list.

In one instance, one or more questions are presented to the user. These questions can include default questions, such as profile questions, and/or questions specified by one or more publishers. For example, after a user subscribes to a channel, one or more questions can be immediately presented to the user. As another example, a content item can include a question, and a user can interact with the content item to identify an answer (e.g., by clicking on an appropriate portion of a screen or by submitting what is typically a destination-requesting input to identify an affirmative (or negative) answer). Answers to questions can be used to customize content items for that user by, e.g., influencing intra-channel selection of content items to present, influencing which channels' content items are presented (e.g., by influencing channels' weighting or rankings), and/or influencing information in a specific content item.

A channel-management service can also access a user's calendar and predict where a person will be at specific times in the future. Thus, not only can channel content be based on a particular user's current location, but it can also or alternatively be based on a predicted future location and/or activity.

In some embodiments, a method provides custom electronic-channel content items to display when a device is in display state. It can be determined that a user device is subscribed to receive content items corresponding to a channel and to present one or more of the content items when the user device is in a display state. Data corresponding to the user device can be identified. The data can correspond to a physical or electronic action (e.g., an interaction with a presented content item or a purchase at a channel-associated virtual or physical store). A customization rule for the channel can be identified. A content item can be generated or selected using the customization rule and the data. It can be enabled for the content item to be presented on the user device when the user device is in the display state.

In some instances, it can be enabled for a question, defined by an entity associated with the channel, to be presented via another content item when the user device is in the display state. A response to the question can be determined based on a user interaction with the other content item. The data can include a response to the question. Generating or selecting the content item can include identifying a content-item template associated with the rule and generating the content item using the template, rule and the data. The performing device can include a computing device remote from the user device. Enabling the content item to be presented on the user device when the user device is in the display state can include transmitting the content item to the user device.

The performing device can include the user device. Enabling the content item to be presented on the user device when the user device is in the display state can include presenting the content item on the user device when the user device is in the display state. The data corresponding to the user device can include data characterizing previous input received that corresponded to an interaction with a previously presented content item. The data corresponding to the user device can include data characterizing previous input corresponding to access a destination associated with a previously presented content item. The data corresponding to the user device can include an estimated location or predicted future location of the user device. The data corresponding to the user device can include data characterizing an event in a calendar associated with the user device. The data corresponding to the user device can include data provided by a merchant device associated with the channel identifying a purchase or appointment. The customization rule can identify how to include at least part of the data in the content item.

In some embodiments, a system is provided that can include one or more data processors and a non-transitory computer readable storage medium containing instructions. The instructions, when executed on the one or more data processors, can cause the one or more data processors to perform a method as disclosed herein.

In some embodiments, a computer-program product can be provided that is tangibly embodied in a non-transitory machine-readable storage medium and that includes instructions configured to cause one or more data processors to perform a method as disclosed herein.

Some embodiments of the present application include one or more computer-readable non-transitory media storing computer-executable instructions that, when executed by one or more computer systems, configure the one or more computer systems to perform operations according to the method above.

DETAILED DESCRIPTION

In some embodiments, systems and methods are provided for non-intrusively electronically presenting content items in a customized manner. Specifically, each publisher in a set of publishers can define a channel (e.g., a "Golf" channel, a "Restaurant X" channel, a "Fantasy Football League Y" channel, etc.). For each channel, the publisher can specify which content items are to be presented to subscribers. In one instance, the publisher can upload a set of content items (e.g., images, text, or videos) which include particular content (e.g., information, alerts or updates, or discounts). Some or all of the content items can be transmitted to a device of a subscriber. When a given user device is in a display state (e.g., which can be entered upon detecting a lack of user inputs for a defined time period), it can present some or all of the received content items for each channel that the user device (or corresponding user) is subscribed to. In some instances, the content items are presented in a sequence, such that it can be determined whether and/or when (in a sequence) a given content item is to be presented.

Techniques disclosed herein provide an ability to customize individual content items, content-item selection and/or content-item sequencing for a particular user and/or user account. Such customization can depend on, for example, data associated with the user or user device, which can include data associated with channel presentation (e.g., which content items were presented on a user device and/or which content items the user interacted with), data received from a party or device associated with a channel, user input data, calendar data, and/or data detected by the user device (e.g., location data). For example, a discount amount can be customized based on a user's past interactions with a company-associated channel's content items, a time until an upcoming appointment with an office associated with a channel or a current location of a user device. As another example, channels can be associated with weightings for a user or user device indicating how many channel-associated content items are to be presented relative to those of other devices. The weighting can be influenced based on, e.g., a number or total value or past purchases at a physical or online store associated with a channel or query-responsive input provided by a user.

In some instances, a publisher can identify particular questions to present to one or more users. The questions can be presented as part of a subscription process and/or as part of content-item presentation. For example, a question can be presented and select user input can direct to a user device to a location where a user can identify an answer, or a binary question can be answered where an interaction is to be interpreted as corresponding to a particular answer. Such responses, which can be combined with general profile information and/or other data, can be used in a customization process.

Figure 1:
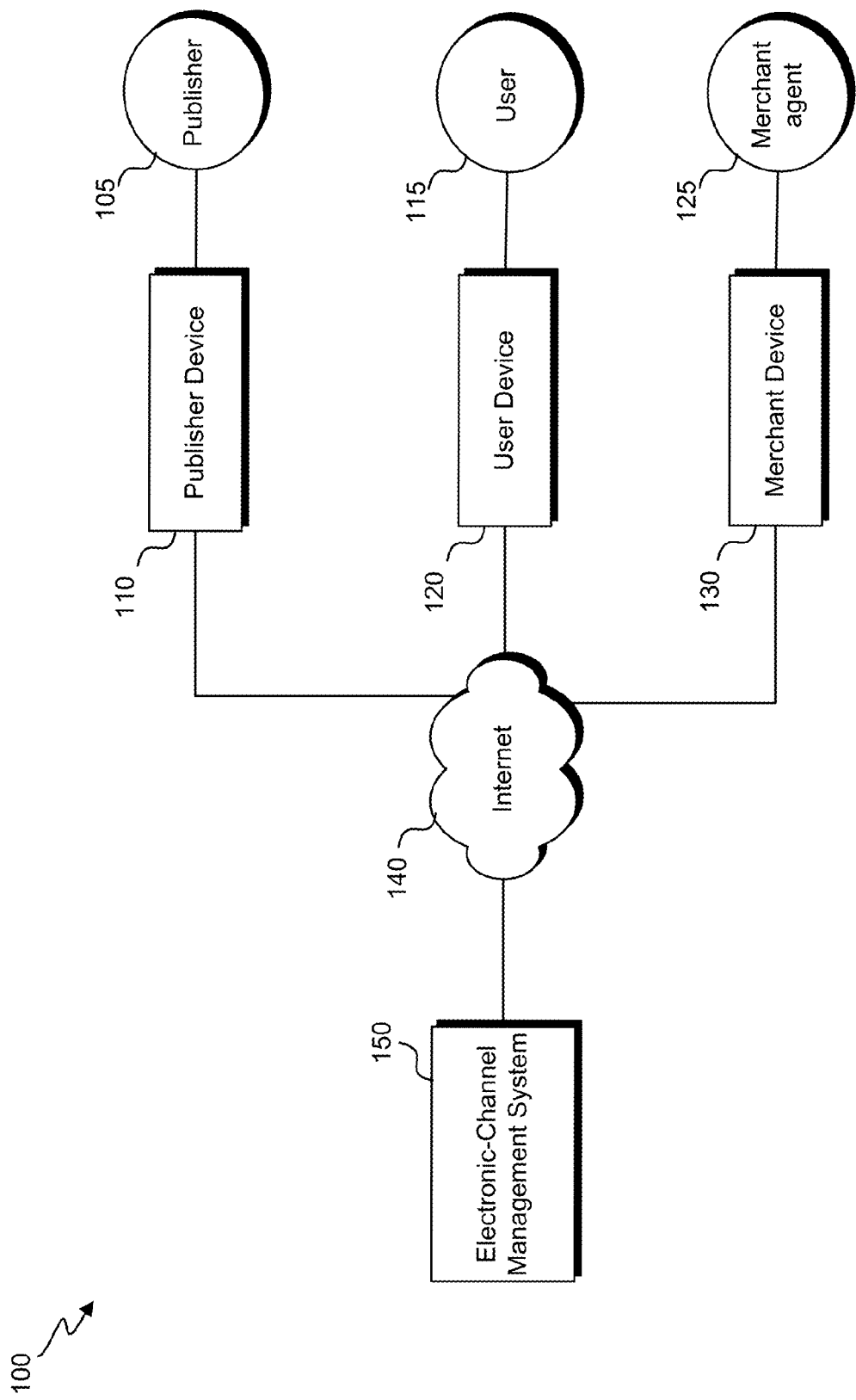
FIG. 1 shows a block diagram of an embodiment of a channel-distribution interaction system.

Referring first to FIG. 1, a block diagram of an embodiment of a channel-distribution interaction system 100 is shown. A publisher 105, user 115 and/or merchant agent 125 can interact with an electronic-channel management system 150 via respective devices 110, 120 and/or 130 and a network 140, such as the Internet, a wide area network (WAN), local area network (LAN), short-rage network or other backbone. Network 140 can include a wired connection or wireless connection. In some instances, multiple networks are used.

In some embodiments, electronic-channel management system 150 is made available to one or more of publisher 105, user 115 and/or merchant agent 125 via an app (that can be downloaded to and executed on an electronic device) or a website. It will be understood that, although only one publisher 105, user 115 and/or merchant agent 125 are shown, system 100 can include multiple publishers 105, users 115 and/or merchant agents 125.

Publisher device 110, user device 120 and/or merchant device 130 can each be a single electronic device, such as a computer or hand-held electronic device (e.g., a smartphone), or a system that includes multiple devices and/or components. The device(s) 110, 120 and/or 130 can comprise a computer, such as the desktop computer, a laptop computer or a tablet. In some instances, a party 105, 115 and/or 125 uses different devices at different times to interact with the electronic-channel management system 150. For example, user 115 may use a computer to subscribe to one or more channels, and channel items associated with the channels can later be presented on a handheld device.

Each of one or more publishers 105 can provide information and/or content items for an electronic channel. For example, a publisher can identify a name, keyword(s) and/or short description for a channel and/or can associate a channel with one or more stores or websites. A publisher can identify one or more user devices and/or users (e.g., by providing email addresses) to invite to subscribe to a channel. A publisher can upload each of one or more complete or partial content items and/or can at least partly define a rule for generating a content item or item selection. A publisher can include any entity at least partly defining a channel and/or what content items are to be associated with the channel. It will be appreciated that, in some instances, a channel is associated with multiple publishers. Different publishers for a given channel may fulfill different roles (e.g., defining high-level channel information versus uploading partial or full content items).

Electronic-channel management system 150 can store channel information and/or content items for the channel. In some instances, electronic-channel management system 150 uses a partial content item and/or rule to generate a content item (e.g., for a particular user and/or context).

Individual users 115 can set up accounts with electronic-channel management system 150 or with another system or device (e.g., a publisher device 110) in order to view content items from one or more channels. An account for a user can be generated, for example, prior to, during or after download of a channel app to a user device. Data pertaining to each user can be collected via an explicit query and/or automatic detection. Account data can include, for example, a user's name, email address, phone number, device identifier, geographic location, interests, school, activities, credit cards, relationships (e.g., to other users or to one or more pets), residential addresses, preferences with regard to channel display, a calendar identifier, calendar data, and/or other preferences (e.g., preferred cuisine types, shops, and/or traveling destinations).

As part of, or subsequent to, account generation, a user can identify one or more channels to subscribe to. In some instances, one or more channel options are identified (e.g., based on user identifications received from publishers or matching or account data to one or more channels) and presented to a user for potential subscription. In some instances, channel-searching input can be received from a user, and identifications of one or more channels partly or fully matching the input can be presented to the user for potential subscription. Account data for user 115 can reflect which channel(s) the user is subscribed to.

For each user and/or user device, electronic-channel management system 150 can select content items to transmit to the user device. Content items can be transmitted, e.g., upon receiving them from a publisher device, at a particular time (e.g., specified by a user or publisher), upon receiving a request from the user device, and so on. In some instances, which content items are transmitted to a given user device can depend, not only a user's subscriptions, but also on account data for the user. For example, which content items are transmitted for a grocery-store channel can depend on a user's residential address (e.g., such that the content items can focus on products locally sourced or reported to be locally in excess supply).

Customization can further or alternatively be performed at user device 120. User device 120 can include account data for a user which can overlap and/or mirror account data at electronic-channel management system 150. User device 120 can use account data (e.g., beyond mere channel subscriptions) to, for example, generate a custom content items, select between a channel's content items, and/or select between channels for a content item.

User device 120 can further detect display-state data and/or user-action data, update a local user account based on the data and/or transmit identifications of the data to electronic-channel management system 150. User actions can include, for example, selecting a destination for a content item, sharing a content item, printing a content item, saving a content item. Display-state data can include a time period in a display state, a frequency of entering display state, what prompted entry into display state (e.g., detection of extended inactivity or an affirmative request to enter display state), etc. Customizations can then be performed based on the display-state and/or user-action data (e.g., to bias towards presentation of content items with a characteristic matching those that the user interacted with).

In some instances, a channel is associated with one or more merchant agents. For example, a channel can be associated with one or more physical or virtual locations, such as one or more restaurants, shops, service locations e-commerce websites, schools, associations and/or churches. Content items for the channel can identify, e.g., a merchant location, an offering at a merchant location, a discount that can be redeemed at a merchant location, an appointment opening at a merchant location and/or an event scheduled to occur at a merchant location. A merchant device 130 can receive input from merchant agent 125 indicating, for example, that a particular user visited the location, when the visit occurred, a duration of the visit, whether a purchase was made, what was purchased, whether a discount was redeemed, an assignment assigned, a grade given, and so on. Merchant device 130 can communicate such information to electronic-channel management system 150 (which may transmit the data to user device 120), and channel-related customizations can be influenced.

In some instances, electronic-channel management system 150 can provide, manage and/or generate one or more apps to deliver content items for one or more channels. In one instance, a single multi-channel app has the capability of routing or generating content items from multiple channels to a user device. In one instance, an app is dedicated to a specific channel, such that content items delivered or generated using the app are for a single channel. In one instance, content items for a channel can be delivered or generated via either the multi-channel app or the dedicated app. For either the multi-channel or dedicated app scenario, electronic-channel management system 150 can manage channel information, route channel content items, transmit content-item generation rules to devices, receive and store user data, send user data to publishers, etc.

As one example, a user device may detect a channel-associated code (e.g., after scanning the code). The device may present one or more of the following options: download a dedicated channel app for the associated channel, download a multi-channel app (e.g., if it is not already on the device), add the channel to a channel list for the multi-channel app (e.g., such that presentation of content items for the channel can be distributed amongst content items from other channels while the device is in a display state). In some instances, one or more of such responses are automatically performed, and another is presented to the user as an additional option.

Figure 2:
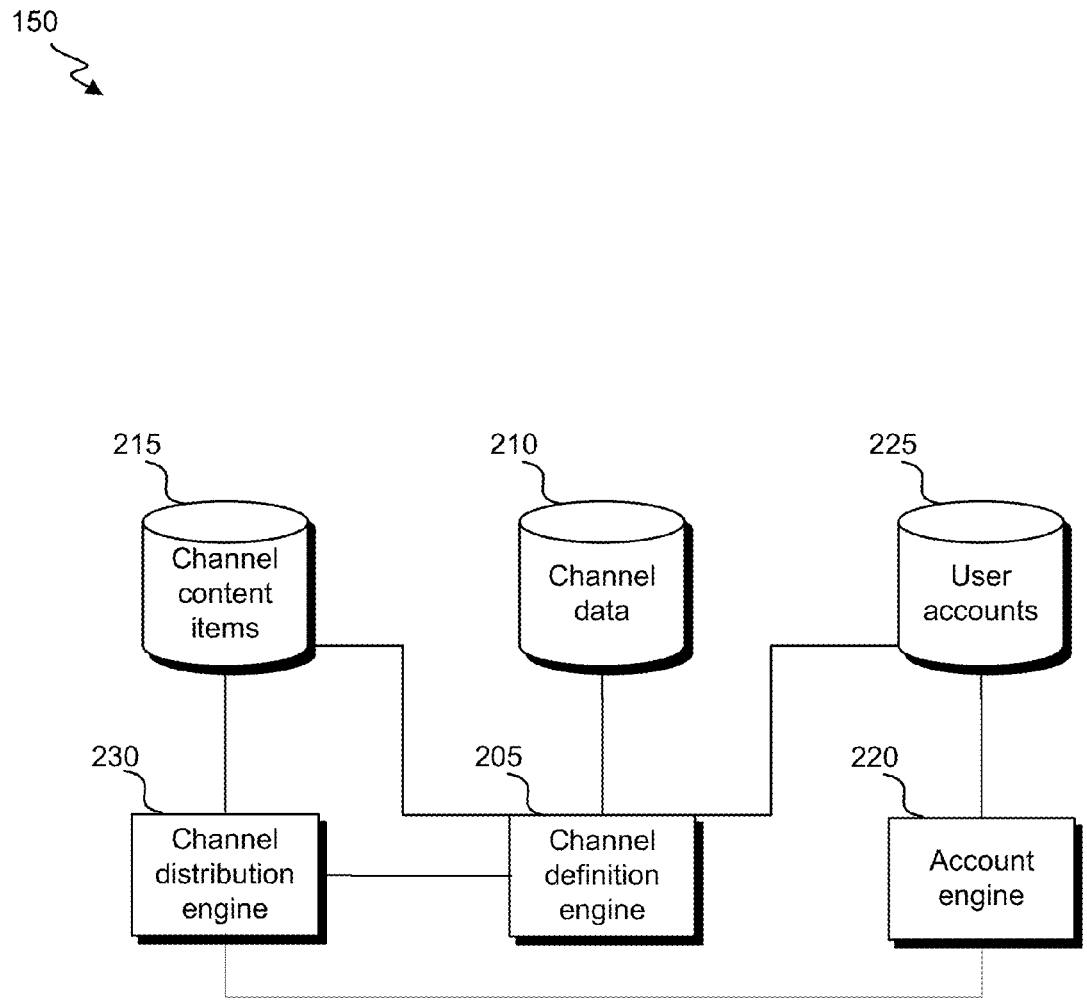
FIG. 2 shows a block diagram of an embodiment of electronic-channel management system.

Referring next to FIG. 2, a block diagram of an embodiment of electronic-channel management system 150 is shown. Electronic-channel management system 150 can be, in part or in its entirety, in the cloud. In some instances, at least part of electronic-channel management system 150 is present on a device, such as a server or a publisher device 110. Electronic-channel management system 150 can include a distributed system (e.g., part residing in the cloud and part on a publisher device). Further, it will be appreciated that each of one or more components of exam administration system 150 may reside on multiple devices.

A channel definition engine 205 can receive information from a publisher (e.g., directly or via a publisher device) that at least partly defines a channel. The information can include descriptive information that can provide an indication as to what types of content items will be presented via the channel. The information can include, for example, a channel name, a publisher name, a name of one or more channel-associated merchants (e.g., stores), a channel description, a channel keyword, a channel category (e.g., informational or promotional; or sports, crafts, school or news). The information can be stored for a particular channel, e.g., upon receipt of the information from a publisher, upon receiving some or all of the information and/or a fee.

In one instance, a publisher (e.g., any publisher or a publisher with a particular membership) can reserve a channel name for a period of time (e.g., by identifying the name and/or paying a fee). Channel definition engine 205 can prevent another channel from being named with a same channel name during the time period. In some instances, the period of time can be extended with additional fee payments.

The information can relate to content-item presentation specifics and/or distribution specifics. For example, the information can identify a frequency and/or time when content items are transmitted to user devices, how frequently new content items are made available, how many content items are made available, a type of one or more content items (e.g., video, image or text), and/or a presentation duration for one or more content items. The information can identify which users are to be permitted to or prevented from subscribing to the channel and/or which users are to be invited to subscribe to a channel (e.g., with user identifications being made via submission of user names, email addresses or phone numbers). The information can identify one or more codes to associate with the channel, such as a QR code or bar code. Data for each channel can be stored in a channel data store 210.

Channel definition engine 205 can also receive and/or generate content items for each channel. For example, channel definition engine 205 can receive content items from a publisher device and/or generate a content item based on a rule. In some instances, a rule indicates that a content item is to be retrieved from and/or generated based on content available at an identified webpage. Such a rule can, for example, allow a publisher to simultaneously update a webpage and channel content (e.g., to reflect current product or sales offerings, current discounts, etc.). Such a rule can also or alternatively allow a content item to be updated based on external events (e.g., current or predicted weather, current financial statistics, current news, a current sports score, etc.).

Channel content items can be stored in channel content items data store 215 in association with a channel identifier. Each of one or more channel items can further be stored with an indication as to when it is to be distributed to user devices (e.g., a time or a rule for distribution) and/or when it is to be presented (e.g., a priority ranking indicating when it is to be presented relative to other items for a channel, a duration for presentation, an expiration after which it is no longer to be presented, etc.).

In some instances, a rule indicates that a content item is to be generated based on data associated with one or more users. An account engine 220 can associate each user with a user account and can store account data in a user account data store 225. Account data for a given user can include information that a user expressly identified and/or information automatically collected or inferred. Account data can, for example, identify which channels the user or one or more devices of the user is subscribed to, a prioritization (e.g., ranking) of each of one or more channels and/or presentation and/or distribution specifications for each of one or more channels or for all channels (e.g., indicating when content items are to be received). Account data can also or alternatively include, for example, information identifying channel preference (e.g., amongst those subscribed to or generally), past channel-related actions, past merchant-related interactions, a current location, calendar data and/or a predicted location. Account data can be used to generate a content item for the user, select a content item for the user (e.g., amongst a set of items associated with a channel), select a channel, select a distribution time, etc.

In some instances, a channel distribution engine 230 can select one or more content items associated with a channel and transmit the content item(s) to each of one or more user devices (associated with a same subscriber to the station or with multiple subscribers). Thus, it will be appreciated that one or more content items can be simultaneously transmitted to devices of multiple subscribers or transmission can occur at different times. In some instances, content items that are transmitted to different devices (e.g., different devices associated with a same user and/or devices associated with different users). For example, Device A of User A may receive content items A and B of a channel, Device B of User A may receive content items A and C, and Device C of User B may receive content items B and D. The selection of which content items to transmit can depend on data associated with a given user and/or device.

In some instances, in addition to or instead of transmitting content items, channel distribution engine 230 transmits a rule for generating a content item for a channel. In some instances, portions of content items that can be used to build a content item are transmitted. For example, a template can be transmitted, which a user device can build upon according to a rule.

Figure 3:
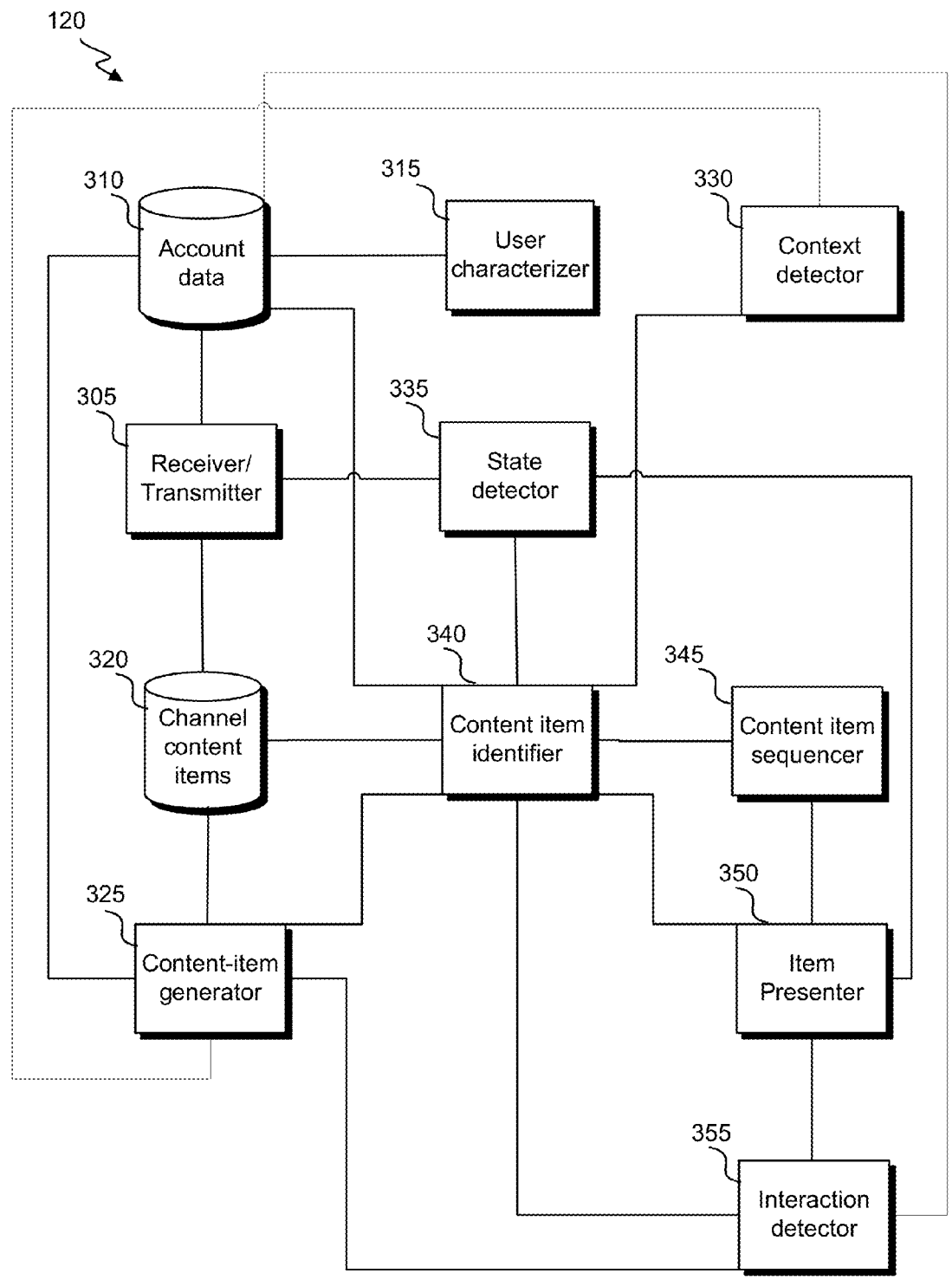
FIG. 3 shows a block diagram of an embodiment of a user device.

Referring next to FIG. 3, a block diagram of an embodiment of a user device 120 is shown. It will be appreciate that in some embodiments depicted components or a part of each of one or more depicted components can instead be present, e.g., in the cloud, as part of electronic-channel management system and/or as part of a publisher device.

User device 120 includes a receiver/transmitter 305, which can communicate with electronic-channel management system 150, one or more publisher devices 110 and/or one or more merchant devices 130. Receiver/transmitter 305 can receive and/or transmit account data associated with device 120 and/or a user of device 120. An account data store 310 can include general data pertaining to a user, general data pertaining to device 120 and/or channel-specific data. Account data can include data related to device 120 (and/or a user thereof) received from another device and/or locally detected or inferred data related to device 120 (and/or a user thereof). For example, a user characterizer 310 can monitor a user's interactions with a device (e.g., app execution, submitted queries, or times of input), retrieve locally stored data (e.g., calendar data) and/or detect sensor readings (e.g., identifying a location of a device and/or screen activity).

Account data can identify, for example, a user's age, residential city, occupation and/or grade level, hobbies, and/or interests. Account data can also identify a user's or device's channel subscriptions and/or channel prioritizations. For each channel or across channels, account data can include statistics regarding content-item viewing (e.g., which items were viewed, start times of display sessions, durations of display sessions). For each channel or across channels, account data can include identifies or characteristics of content items for which the user requested a destination, that the user saved, that the user shared, that the user printed and/or that the user otherwise interacted with. Account data can include statistics related to, for example, destination requests, saving, printing and/or sharing (e.g., a count or frequency per channel or per content-item characteristic, such as promotional content items). Account data can further include external-based data and/or information regarding purchases, merchant visits, redemptions of offers (e.g., presented on content items), geographic location, calendar appointments or events, app executions, downloaded apps, and so on.

Receiver/transmitter 305 can also transmit partial or full content items and/or rules for content-item generation, any or all of which can be stored in association with a corresponding channel identifier in a channel content item data store 320. The partial or full content items and/or rules can include those provided by and/or at least partly defined based on input from a publisher of a channel. In some instances, a rule and/or partial content item is modified by a user of device 120 and/or based on a device-specific or inter-device learning technique (e.g., to increase user interaction).

In some instances, a content-item generator 325 can generate one or more content items for a channel. The content item(s) can be generated according to a defined rule. For example, text or a number can be determined based on user data and/or context data, and the text or number can then be inserted into a template content item. As another example, a locally stored image can be inserted into a content-item template. As another example, a background color of a content item can be set to a color which has been associated with a highest frequency of user interactions. As another example, a URL from a set of URLs can be selected based on a time of day, and data from the selected URL can be part of a content item. The generated content item can, in some instances, also be stored in channel content item data store 320.

As mentioned, a content item generation can depend on a context (e.g., of a user or device). A context detector 330 can detect characteristics of a current context or predict a future context. A context can indicate, for example, a geographical location; a time (which can include a date, day of week or season); a weather characteristic (e.g., temperature, precipitation occurrence or probability, and/or cloud cover); an event or appointment; inferred, known or predicted activity; motion (e.g., whether a device is stationary, whether it is estimated that a user is walking, whether it is estimated that a user is running or biking or whether it is estimated that a user is traveling in a vehicle); and/or a functional location (e.g., a room of a house; or work or home). In some instances, a context reflects an inferred or predicted objective or mindset of a user (e.g., whether a user may be interested in visiting a store in the near future, whether a user is interested in making a service or product of a particular kind, etc.).

Context detector 330 can detect, infer or predict a context based on, for example, user input (e.g., responsive to questions requesting information, such as a default profile-defining question, a question from a publisher of a channel or a question presented in a channel content item), one or more readings from each of one or more sensors on a device, data received from another device (e.g., data received from electronic-channel management system, data received from an external source or website, and/or data from a merchant device identifying recent activity associated with the user device or associated user), and/or locally stored data (e.g., calendar data).

A state detector 335 can identify a state of device 120. The state detection can include identifying one or more current states of the device and/or determining whether the device is in each of one or more particular states. In one instance, state detector 335 can detect whether device 120 is in a channel state.

The device may be in a channel state, for example, when it is device is able to receive one or more channel content items (e.g., connected to a network) and/or when one or more item-receipt preconditions are satisfied. A condition can require, for example, that a CPU usage be below a threshold, that a screen be locked, that input has not been received for a period of time, and/or that a current time is within a defined timer interval. A definition for the channel state, in some instances, can vary across channels. Upon detecting that a device is in a channel state, state detector 335 can initiate a process by which channel content items are received from a source (e.g., electronic-channel management system or merchant device). For example, state detector 335 can cause a request (e.g., with a device and/or user identifier and/or one or more channel identifiers) for content items to be sent to a source. As another example, state detector 335 can initiate formation of a connection between device 120 and a source.

State detector 335 can also or alternatively detect when device 120 is in a channel display state. The device may be in a channel display state, for example, when it is device is able to present (e.g., visually, audibly and/or haptically) one or more channel content items (e.g., connected to a network) and/or when one or more display preconditions are satisfied. For example, a device can enter a display state upon detecting inactivity (e.g., lack of touches, selections, button presses, keystrokes, being on a phone call, and/or voice commands) for a defined period of time, detecting a particular input (e.g., pressing a specific function key), detecting a termination of a call or video, detecting a device movement (e.g., moving a device away from a user's head) or position, etc. A second condition can cause a display to end or to be suspended. For example, a device can suspend a display state upon detecting user input (e.g., any screen touch, option selection, button press, keystroke and/or voice command), detecting an incoming call or message (e.g., SMS message), detecting a device movement or position, detecting a particular input (e.g., pressing another specific function key), etc. In some instances, a same or similar occurrence can prevent a device from entering a display state.

When state detector 335 detects that device 120 is in, is entering and/or is about to enter a display state (e.g., which may be detected upon detecting a period of inactivity slightly below that in a display-state precondition), a content item identifier 340 can select one or more content items to be presented via an interface on device 120. In some instances, content item identifier 340 can select a content item from channel content items data store 320. In some instances, content item identifier 340 can request that content-item generator 325 generate a new content item.

Which item is selected can depend, for example, on a prioritization (or ranking) of channels associated with device 120 or a corresponding user, a prioritization (or ranking) of content items (e.g., as identified by a corresponding publisher) within a channel, a current context characteristic, a predicted further context characteristic, a user preference, a pseud-random element, and/or an empirical (e.g., cross-user) statistic for one or more content items (e.g., indicating a portion of presentations followed by a user action). A prioritization of channels and/or content items can be specific to items and/or to item characteristics (e.g., prioritizing sports channels over news channels or prioritizing discount content items over information content items). A prioritization of channels and/or content items can be based on, for example, input (e.g., from a user of a particular device, from one or more other users, and/or from one or more publishers), a user-specific or cross-user learning algorithm (e.g., that identifies item types likely to lead to user actions), channel characteristics (e.g., whether an associated publisher is associated with a more expensive or higher quality membership than another publisher), and/or a content-item-presentation history. A prioritization can be static or can change in time and/or based on context.

In some instances, content item identifier 340 selects one content item at a time. Each content item can be selected according to an absolute-time or functional-time protocol. For example, a new content item can be selected upon an end of each content-item presentation, or a new content item can be selected every 10 seconds while in a display state. In some instances, following (e.g., immediately following) a selection of a content item, the content item is presented. In some instances, upon selecting a content item, the item is added to a presentation queue (e.g., at a bottom of the queue).

In some instances, content item identifier 340 can select a group of content items. One, some or all of the content items in the group of content items can be, for example, ordered and added to a queue. The group can include content items corresponding to a single channel or to multiple channels. A number content items to be selected by content item identifier 340 can be fixed or can vary depending on, for example, presentation durations of particular content items, a size of a presentation queue, a connection strength, a content-item sequence identified by a publisher, and/or a time of day. For example, the group can include a sufficient number of content items to correspond to a group-total presentation duration of one minute.

User device 120 can include a content item sequencer 345. Content item sequencer 345 can assess and/or identify an order for presenting multiple content items. In one instance, content item sequencer 345 can evaluate one or more content items previously presented or queued to be presented. This evaluation can include, for example, identifying a number (or total duration) of content items associated with each channel, a number (or total duration) of content items associated with a category or characteristic (e.g., including a discount), a variability with regard to content items' channels, categories or characteristics, and/or whether a recently presented or queued content item is part of a publisher sequence. Based on the evaluation, content item sequencer 345 can identify a particular content item, a content-item category or a content-item characteristic for a content item to be presented or queued in the future (e.g., next, following the next item, etc.). Thus, in some instances, content item sequencer 345 can identify a constraint for a selection of a content item.

For example, content item sequencer 350 can identify that 10% of content items presented in the last five minutes were discount content items. Meanwhile, a protocol (e.g., as determined based on user input, channel definition, and/or a learning algorithm) can indicate that 20% of the content items are to be discount content items. Thus, content item sequencer 345 can determine that a content item to be selected for upcoming presentation can be a discount content item and/or that the selection can be biased towards discount content items. Thus, content item sequencer 345 can interact with content item identifier 340 during a content-item selection and/or content item sequencer 345 can evaluate and/or order content items already selected (e.g., and queued) by content item identifier 340.

In one instance, content item sequencer 345 evaluates a set of content items for actual or potential presentation. For example, content item identifier 340 can select a set of 15 content items for presentation and can add them to a queue (e.g., in an unordered fashion). Content item sequencer 350 can then order the content items for presentation. This ordering can be performed in part or in full by identifying characteristics of the specifically selected content items. The ordering can be performed to, for example, identify higher priority content items and bias the ordering towards early presentation, bias towards sequential presentation of same-channel content items, bias towards channel variability (e.g., towards high channel entropy) and/or bias towards category or characteristic variability (e.g., towards high category and/or characteristic entropy). For example, if three content items were selected—one being informational and two identifying discounts, content item sequencer 345 may order the informational content item between the discount content items.

Ordering the content items can include placing content items in a queue and/or generating or modifying a playlist. In some instances, a content item is selected, ordered and/or queued in real-time and/or when device 120 is in or is about to enter a display state. In some instances, the selection is made in advance.

An item presenter 350 can then present a selected, ordered and/or queued content item. The presentation can occur when device 120 is in a display state. In some instances, one content item can be presented at a time. Which content item is presented can be determined based on an identification made by content item identifier 340, a position of one or more content items in a queue, and/or a sequence (or order) for presentation as identified by content item sequencer 345. Item presenter 350 can, for example, continue to present content items so long device 120 is in a display state (e.g., until state detector 335 detects that device 120 is no longer in a display state). For example, state detector 335 can detect that device 120 is no longer in a display state upon detecting particular input types (e.g., those not associated with an action option for a content item, those associated with a particular characteristic or a particular keystroke).

Presenting the content item can include providing a visual, audio and/or haptic stimulus. The presented stimuli can depend on and/or include those defined by a publisher of a channel and/or associated with a content item and/or those identified as a result of a rule. For example, a publisher or user can define a rule such that presentation of every discount content item (e.g., for a given channel) is to be accompanied by a tone or that presentation of every high-priority content item is to be accompanied by a vibrating stimulus.

One or more user-action options can be presented along with a content item. The actions may, or may not, differ across content items. Action options can include an option to, for example, save a content item (e.g., to a local storage), print a content item, share a content item (e.g., via email, a social network, SMS message, etc.), visit a destination, locate a corresponding merchant location, view one or more user-review variables or text, and/or book an appointment (e.g., at a merchant location).

An interaction detector 355 can detect whether a user interacts with a content item, can infer whether a user is viewing (or otherwise receiving) a content item, and/or can detect whether a user has selected a user-action option. For example, interaction detector 355 can monitor a sensor reading (e.g., to estimate a device height, angle and/or movement) to infer whether a user is viewing a screen of device 120. As another example, interaction detector 355 can monitor a camera feed to detect whether a user is in front of and/or looking at a screen of device 120. As yet another example interaction detector 355 can detect whether a user input corresponds to selection of an action option (e.g., by touching or clicking on a particular screen location, making a particular gesture or voicing a particular voice command).

In some instances, detection of a particular action can influence what is subsequently presented. For example, presentation of a first content item may be followed by presentation of a second content item unless device 120 is no longer in a display state or a user action is detected. In the latter case, a presentation following the first-item display can correspond to the action (e.g., to allow a user to identify who an item is to be shared with, to interact with a destination website, to identify a saving location, etc.).

Interaction detector 355 can store data corresponding to interactions and/or cause such data to be transmitted (e.g., to electronic channel management system 150 and/or one or more publisher devices 110). The data can include, for example, an identifier of a channel, an identifier of a content item, an identifier of whether it was inferred that a user was viewing the item, an identifier of whether a user selected an action, an identifier of which action(s) were selected, a time (which can include a day and/or date) at which a content item was presented, an identifier of a user device on which the item was presented, and/or an identifier of a user associated with the device.

In some instances, data detected by interaction detector 355 can influence subsequent content-item identifications and/or generations. For example, if a user frequently shared content items associated with restaurant channels, content item identifier 340 could adjust an item selection technique to increase selection of content items from restaurant channels. As another example, if a user frequently saved channel items with discounts of 15% or more, content-item generator 325 could adjust its generation techniques to be biased towards discounts of this type.

In some instances, detected interactions are associated with context data and/or sensor data, such as a time of day, location (e.g., absolutely or relative to one or more merchant locations) and/or time into a display state. Item selection and/or generation can then be updated not only based on the detected interaction (or lack thereof) but also on the sensor or context data.

It will again be appreciated that one or more the depicted components of user device 120 (or a part thereof) may instead or additionally be present on another device, such as a server or publisher device. For example, electronic channel management system 150 can include a content-item generator 325, which can generate one or more content items for all users, a group of users (e.g., sharing a characteristic, such as a channel ranking and/or interaction characteristic) or a specific user.

Figure 4:
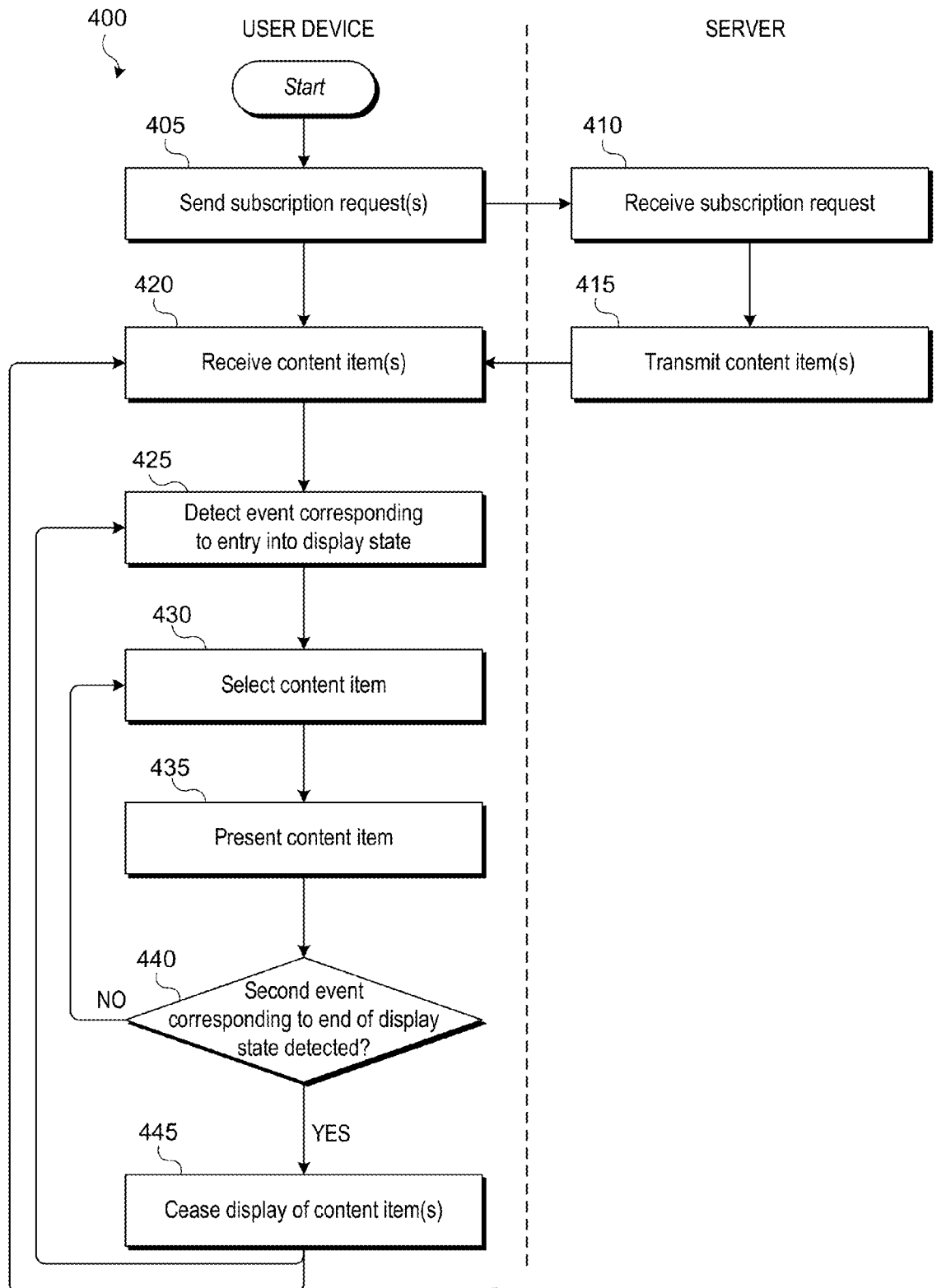
FIG. 4 shows a flow diagram of a process 400 for displaying of a channel's content items on a user device according to an embodiment of an invention.

FIG. 4 shows a flow diagram of a process 400 for displaying of a channel's content items on a user device according to an embodiment of an invention. Various portions of process 400 can be performed by a user device, and other portions can be performed by another device, such as a server, electronic channel management system or publisher device.

Process 400 begins at block 405 where a user device sends a channel subscription request. The request can be automatically sent, e.g., in response to the user device scanning or otherwise detecting a channel identifier, such as a QR code, bar code or near-field communication code. In some instances, such code includes an identifier of a channel, and either the code or other information accessible to the user device indicates where the request is to be sent. For example, the user device may already include instructions pertaining to access to and interaction with a channel management system (e.g., that identifies an IP address, email address, phone number or other destination identifier). As another example, a scanned code can identify an identifier of a publisher device or other channel-associated device. The subscription request can include an identifier of the device and/or of an associated user. The subscription request can include an IP address, an identifier of a type of the user device (e.g., a mobile device, laptop or desktop computer), an identifier of an operating system on the user device, an identifier of a channel-management app on the user device, and/or one or more user preferences. The subscription request can correspond to a request to receive channel content items for a particular channel.

In some instances, upon scanning a code or otherwise identifying a channel via a user device, channel-identifying information is presented to the user along with an option to send the subscription request (e.g., as well as subscription-customization options, such as identifying content item categories of interest or content-item transmission frequencies). Selection of the option can correspond to the subscription request.

In some instances. the request can be sent to a remote device, such as a remote publisher device or server. In some instances, the request can be sent to a nearby device, such as a device presenting a code (e.g., a merchant terminal). The request can be sent over a network, such as the Internet, and/or via short-range communication. To send the request, the user device can, for example, access an application (e.g., a web browser, a software "app" on a mobile device) to communicate with the receiving device.

The subscription request is received at block 410. FIG. 4 shows the request as being received by a server. It will be appreciated that the request can be received by a variety of devices, such as an electronic channel management system, remote publisher device, local merchant device or other channel-associated device.

In some instances, the receiving extracts data from the subscription request (e.g., a user or device identifier) to search for a user or user device profile amongst a set of profiles. When no profile is found, a new profile may be generated. Profile data can be based on inputs received from the user (e.g., during a request for the channel service or a subscription request), automatically detected data (e.g., detected from a subscription request), and/or data retrieved from another server (e.g., a social networking server). The server can then associate the identified or retrieved profile with the channel associated with the subscription request. In some instances, the server also assigns a priority to the channel or ranks the channel amongst other channels that are associated with the profile (e.g., based on data in the request prioritizing the channel, identifying interests, historical channel-interaction data associated with the user or user device, etc.).

At block 415, one or more content items can be transmitted to the user device, and at block 420, the one or more content items can be received by the user device. The one or more content items can correspond to the channel associated with the subscription request. One or more content items for one channel may, or may not, be transmitted to the user device along with one or more content items for another channel. The one or more content items may, or may not, correspond to content items of a particular type, being associated with a particular category or having a particular characteristic.

For each of the one or more content items, in some instances, a destination or destination-request option can be transmitted. For example, a destination URL can be transmitted and associated with a content item. As another example, a region of an image can be identified as corresponding to a destination option (e.g., such that a device is to be routed to a destination upon a touch of or click on the region). For each of the one or more content items, in some instances, identifications of action options to be presented with the item are also transmitted. For example, information can indicate that a content item is to be presented with a locate option to find a nearby store corresponding to a channel and a calendar option to make an appointment at a store (e.g., along with default action options, such as sharing, saving and printing).

The transmission can occur at particular absolute or functional times. For example, the transmission can occur at a particular time each day or week (e.g., as defined by a channel publisher or a manager of a channel-managing system). As another example, the transmission can occur upon detecting a threshold number of new content items (e.g., associated with a channel or associated with a combination of channels that a user device or corresponding user is subscribed to). As yet another example, the transmission can occur upon receiving a transmission instruction from a publisher device.

In some instances, the transmission can occur upon receiving a content-item request from the user device. Such request can be sent, for example, upon detecting that the device has or is about to enter a display mode (e.g., determining that the device has been inactive for a time period of four minutes, while entering a display ode requires inactivity for five consecutive minutes), detecting a user input requesting content-item transmission, detecting that a threshold number of locally stored content items (generally or for a particular channel) have been presented or presented a threshold number of times, detecting that an average (or median or mode) presentation count for content items (generally or for a particular channel) have been presented at least a threshold number of times, detecting that a time corresponds to a user-defined content-item receipt time, etc. In some instances, multiple condition satisfactions are to be detected before a content-item request is sent and/or content items are transmitted.

At block 425, the user device detects an event corresponding to entry into a display state. For example, when the event includes some predetermined amount of time and/or time period of inactivity at the user device, the user device may enter a display state. The inactivity at a device can include a lack of interaction between a user and a user device, including key strokes, cursor movements, selections, dragging, tapping, and/or clicks. In another example, the inactivity can include identifying when particular programs or software applications are not active (e.g., video conference call, teleconference call, streaming media) to help ensure that the device is idle or otherwise less used for a particular amount of time. In another example, an event corresponding to entry into a display state may be termination of a phone call on a mobile phone, or connection of a power charging device to a mobile computing device.

The predetermined amount of time of inactivity at the user device can include a predetermined amount of time, such as 10 seconds, 30 seconds, 1 minute, 3 minutes or 1 hour. In some examples, the time period can be specified based on settings on the user device (e.g., power-saving settings) or based on global or specific channel data (e.g., a server can define that the time period is 1 minute, or a user can enter input specifying a time after which channel content items should be displayed). In some examples, the predetermined amount of time can include the amount of time after an activity or event has ended (e.g., presentation of content items could begin after a call has ended on a mobile device).

In another example, the event can correspond to the user's request to enter a display state. In some embodiments, when the user device is a desktop or similar device associated with a keyboard I/O device, the user device may enter a display state in response to an interaction. For example, the interaction may include a selection of a predefined key, such as an F10 key to enter the display state, and an F9 key to exit the display state. In some embodiments, the user may press Alt-Tab to activate a graphical user interface (GUI) that allows the user to provide commands to enter and ESC to exit the display state through the GUI.

At block 430, the user device selects an item to present. In one instance, the selection is based on a queue or playlist that identifies an order for presenting content items. A queue or playlist can be intra-channel and/or inter-channel. For example, a playlist can include an ordered list of content-item identifiers where the identified content items are associated with multiple channels. The user device can then select an item from a beginning or end of the list or an item associated with a particular absolute or functional time. As another example, each channel that the user device is subscribed to can be associated with an intra-channel playlist that orders content items within the channel. An inter-channel playlist can identify a sequence or protocol for selecting between content items. The user device can first determine which channel a content item is to correspond to (e.g., by identifying a channel identifier in the inter-channel playlist that is at the beginning or end of the list or associated with a particular functional or absolute time) and can then select a content item for the channel using the appropriate intra-channel playlist.

In some instances, the generation of a playlist or queue and/or another technique for selecting a content item can evaluate one or more locally or remotely stored content items based on one or more factors. For example, a factor can include a ranking of an associated channel (e.g., as identified by a user or learned based on user interaction behaviors).

In some instances, evaluating content items can include biasing or restricting a selection or inclusion in a queue or playlist towards content items having a particular characteristic. The characteristics can include, for example, a temporal characteristic, such as an indication that the content item was recently received from the server or recently received at the server from a publisher. Another temporal characteristic can include an indication that an event or expiration time associated with the content item is approaching (e.g., less than a defined time interval away or is within a defined time period from an event time).

In some instances, a calendar associated with a user or user device is identified, and an upcoming appointment or event is identified on the calendar. An item selection can then be biased towards items associated with the appointment or event (e.g., to show items from a channel associated with the appointment or event and/or to show items associated with a location near a location for the appointment or event).

In some instances, a content-item selection can be based on sensor data. For example, an item selection can be biased to show content items associated with a location near an estimated location of the user (e.g., estimated based on device-received GPS or access-point signals).

At block 435, the user device presents the selected content item. The content item can be visually displayed (e.g., in a full-screen mode or in a part of the displayed) and/or displayed in other modalities (e.g., audibly). In some instances, one or more action options (e.g., default action options and/or ones associated with the item) are presented along with the content item. In some instances, action options are not expressly presented, though the option of particular options remain (e.g., where a particular input corresponds to a request to visit a destination even if no explicit indication is provided identifying the option).

The content item can be presented for a particular duration, which can be set for a given channel or across channels and/or which can be defined by a user or publisher.

At block 440, the user device determines whether a second event corresponding to the end of the display state is detected. The second event can correspond to receipt of user input or receipt of specific user input (e.g., not associated with channel-item user options). In some instances, the second event can correspond to a receipt of user input corresponding to a user action (e.g., corresponding to a request to visit a destination). In some instances, the second event corresponds to being in a display state for a threshold period of time (e.g., generally or without detecting any interaction).

When a second event is not detected, process 400 returns to block 430 where another content item is selected and presented. When a second event is detected process 400 continues to block 445 where display of channel content items is ceased. Process 400 can subsequently return to block 420 to receive one or more content items and/or to block 425 to detect an event corresponding to entry into a display state.

Additional detail about electronic channels are disclosed in U.S. application Ser. No. 14/256,785 (filed on Apr. 18, 2014), Ser. No. 14/101,056 (filed on Dec. 9, 2013), Ser. No. 14/101,103 (filed on Dec. 9, 2013) and 61/908,899 (filed on Nov. 26, 2013). Each of these applications is hereby incorporated by reference in its entirety for all purposes.

Figure 5:
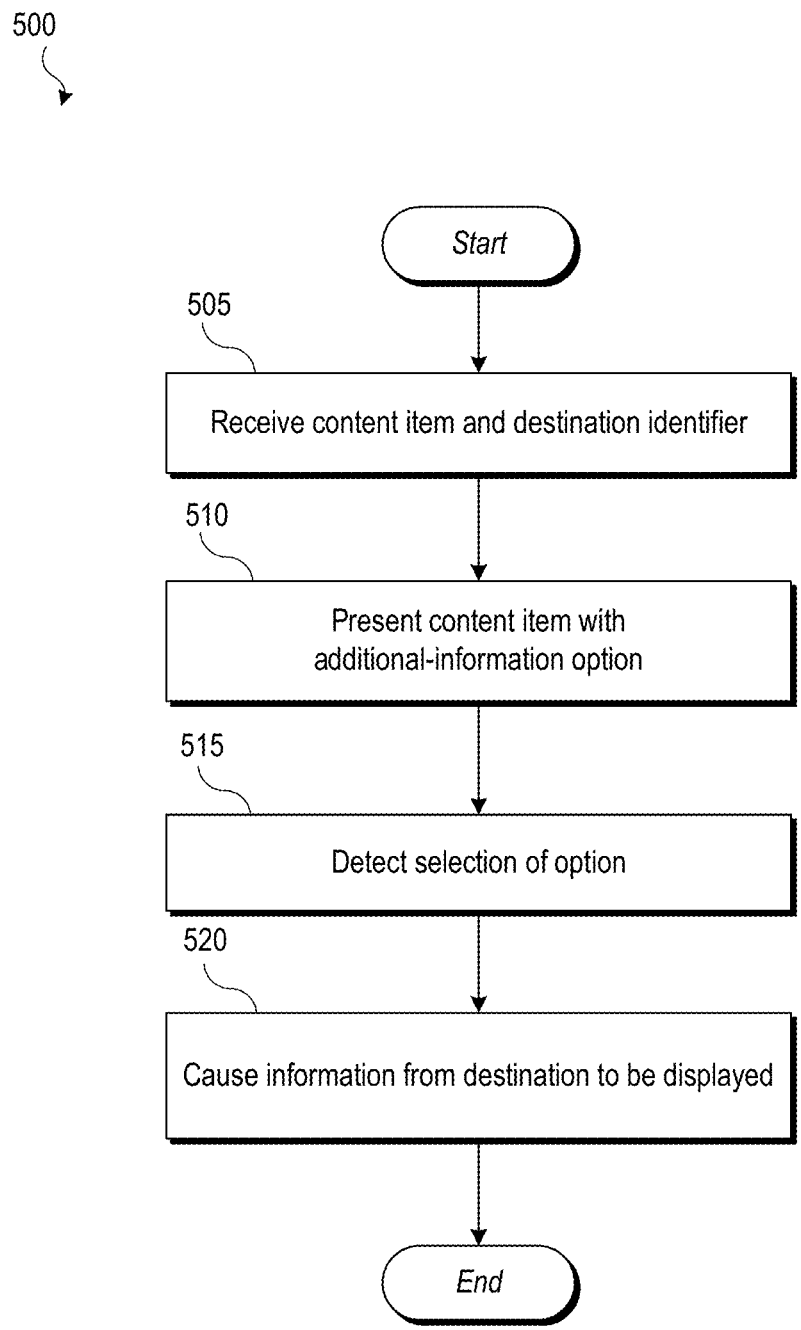
FIG. 5 shows flow diagram of a process for displaying interactive channel content at a user device according to an embodiment of the invention.

Content items can be presented in an interactive manner, whereby user interactions can influence what material is presented. In one instance, the effect of an interaction can be differentially defined for individual content items. FIG. 5 shows flow diagram of a process 500 for displaying interactive channel content at a user device according to an embodiment of the invention. Part or all of process 500 can be performed by a user device, server, publisher device and/or electronic channel management system.

Process 500 can begin at block 505 where a content item is received along with an identifier of a destination. In some instances, information is also transmitted that indicates what user action is to correspond to a request to visit a destination. For example, the information can identify a portion of a content item or icon, where selecting, clicking on or touching the portion or icon is to correspond to a destination request. As another example, the information can identify a keystroke that is to correspond to a destination request. In one instance, multiple destination identifiers are received and/or information that defines what is to constitute a request to visit the destination can be received for one or more of the destination identifiers.

The identifier of the destination can include, for example, part or all of a webpage identifier or URL and/or an identifier of another channel content item. In some instances, the identifier of the destination can include the destination itself. For example, a content item can be transmitted along with text that is to be presented (e.g., identifying store locations, phone numbers and/or hours) upon selection of the option.

At block 510, the content item is presented. The content item can be presented along with an express or implicit additional-information option. For example, a visual indicator (e.g., a graphic or text) can be overlaid on or presented next to a content item. As another example, a part of the content item can identify the additional-information option (e.g., "Click here to answer survey for 5 reward points" or "Identify your type of pet: dog, cat or bird"). As yet another example, no visual indicator or audio indicator may be presented to expressly identify the additional-information option, though particular input can nonetheless be interpreted as requesting the additional information. (The input can be identified, for example, on a channel-management screen or help screen.) In some instances, multiple additional-information options are presented (e.g., each associated with a different icon or text).

At block 515, a selection of an option is detected. For example, the selection can correspond to touching or clicking on a portion of a display screen, entering a particular keystroke, making a particular gesture, and/or speaking a particular voice command.

At block 520, it can be caused for information from the destination to be displayed. Displaying information from the destination can include routing a user device to a destination and/or retrieving destination content (e.g., from a local or remote data store). In some instances, displaying information from the destination includes displaying another content item (e.g., that may replace part or all of the presentation of the content item or can be overlaid on the presented content item).

In some instances, presented destination information is customized for a user or user device. For example, a destination webpage can be prepopulated based on data in a profile of a user. As another example, a destination that enables a user to schedule an appointment can be customized to identify appointment openings that do not conflict with appointments and/or events in the user's calendar. As yet another example, products presented in a destination content item and/or webpage can be selected based on interests of the user.

In some instances, a content item identifies one or more items available for purchase. For each item, a name, picture, description, and/or user review can be presented for example. An option can be presented in association with the item that, if selected, is associated with a destination indicative of a user request to order the item. In one instance, the option includes an ability to specify a quantity, color, size or other item characteristic. In some instances, a user account can include, for example, payment information, shipping information and/or billing information, such that the order can be completed while in the display state.

Figure 6:
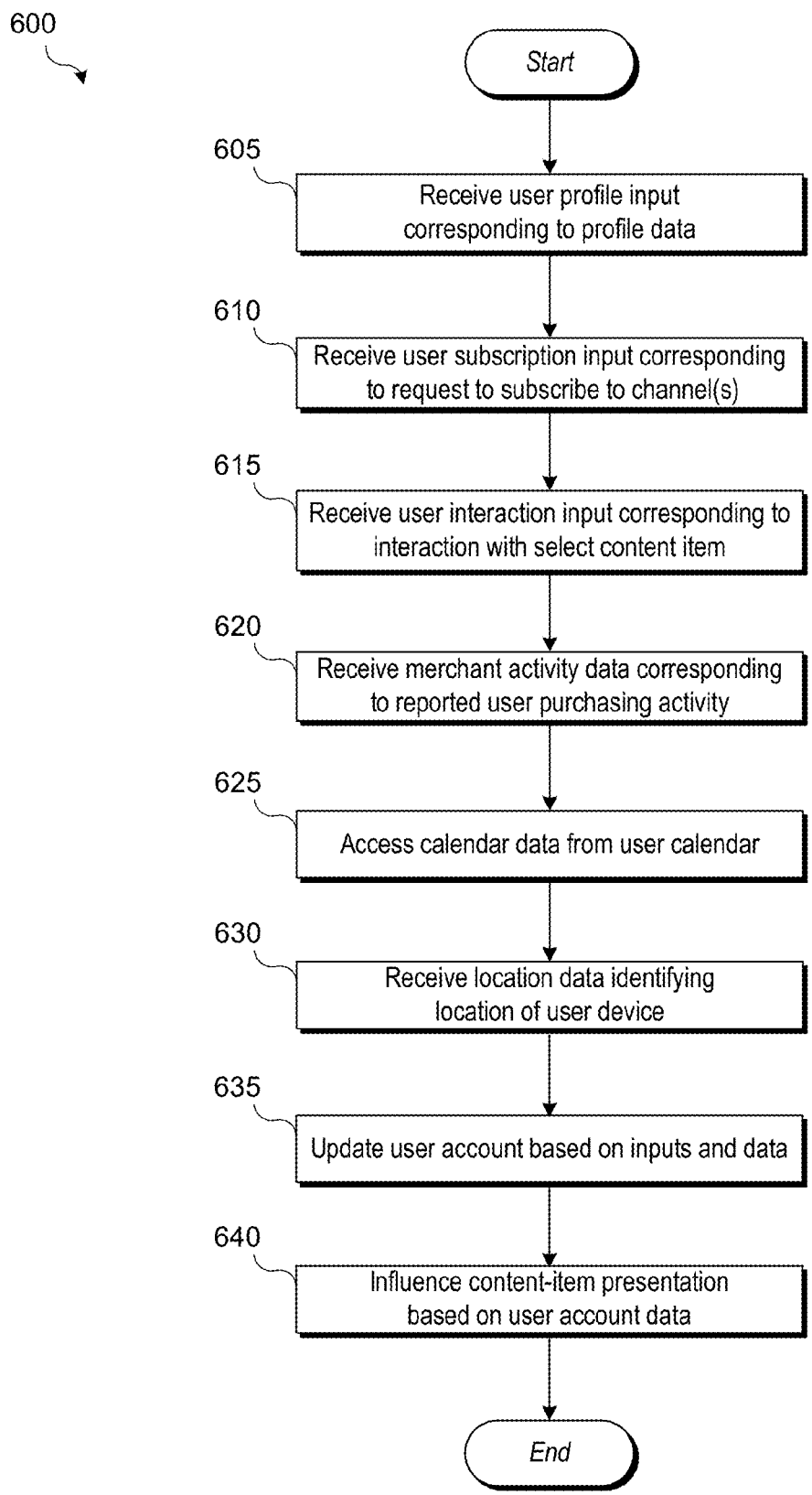
FIG. 6 shows flow diagram of a process for customizing channel content items for a user or user device according to an embodiment of the invention.

FIG. 6 shows flow diagram of a process 600 for customizing channel content items for a user or user device according to an embodiment of the invention. Part or all of process 600 can be performed by a user device, server, publisher device and/or electronic channel management system.

Process 600 begins at block 605 where user profile input corresponding to profile data is received. Profile information can be received, e.g., while a user is signing up with a channel service, while a user is subscribing to a channel and/or at another time. Profile information can include that is required or optional in order for a user device to receive channel content items in general, for a particular channel or of a particular type. Profile information can be received following presentation on a user device of a request for the information. The request can be accompanied, for example, with text boxes, radio buttons, drop-down menus, and so on such that the user can identify the information. In some instances, some or all profile information is retrieved from a social network account or other account.

Profile information can include, for example, a user's name, residential address, occupation, email address, hobbies, interests, age, grade level, income, education level, political affiliation, religious affiliation, and/or membership identifications. In some instances, at least some default profile information is received while a user is signing up for a channel service. While or after a user is subscribing to a particular channel, additional profile information can be received. In some instances, a publisher can identify profile information that is to be required or optional. Responses to the request can be stored in a general user profile (though, in some instances, publisher access to the information can be limited), stored in a channel-specific or publisher-specific profile and/or transmitted to a publisher device.

At block 610, user subscription input corresponding to a request to subscribe to one or more channels is received. The subscription input can thus identify one or more channels. In some instances, the subscription input (or other subscription-related input) can identify a priority and/or ranking of each of one or more channels. In some instances, the subscription input identifies subscription preferences or constraints. For example, a user may subscribe to a cooking channel but can indicate that she is only interested in receiving recipes and photos associated with low-fat food.

At block 615, user interaction input corresponding to an interaction with one or more selected content items is received. The interaction can include, for example, saving a content item, sharing a content item, printing a content item, requesting a destination associated with a content item, requesting to schedule an appointment and/or requesting to locate a merchant location associated with a channel. In some instances, the request can cause additional content to be presented. For example, a new content item can be presented or a webpage can be presented. In some instances, the interaction includes a response to a question presented on a content item. The fact that the user provided any interaction may correspond to a particular answer (e.g., "Click here if you are interested in buying a new car.") or an answer can be determined based on, for example, a screen portion selected or touched.

At block 620, merchant activity data corresponding to reported user purchasing activity is received. Merchant activity data can indicate, for example, that a user visited a merchant location, bought a product and/or attended an appointment. Merchant activity data can identify a product or service purchased, information provided at the appointment, a time of a visit, a location of a merchant visited, an identifier of a user and/or an identifier of a user device. In one instance, a user device can interact with a merchant device (e.g., via a short-range communication and/or by the user device scanning a QR code and subsequently transmitting data), such that the merchant device can automatically detect the user device and/or user.

At block 625, calendar data from a calendar associated with the user or user device is accessed. The calendar can include on stored locally on a user device, one associated with a channel account of a user, one associated with a particular channel and the user and/or user device. Calendar data can indicate when a events and/or appointments are scheduled and/or when availability time slots are. In some instances, appointment and/or event details are identified. For example, the data can identify a location of an appointment or event and/or a company or person associated with the appointment or event (e.g., one providing a service as an appointment). In some instances, the calendar data can identify a channel associated with an appointment or event.

At block 630, location data indicative of a location of a user device is received. For example, a device can transmit its location every time it enters a display state, at prescribed times or timer periods, and/or upon receiving a request for location information. The location can be determined based on, for example, GPS or access-point signals or network connectivity (e.g., to determine whether a device is connected to a home network or to a work network or to another network).

At block 635, a user account is updated based on one or more of the inputs and/or data. For example, the account can be updated to include some or all of the information associated with the input and/or data received or accessed at one or more of blocks 605-630. The account can further be updated to associate such information with a time (e.g., a time at which associated input was received or data accessed or a time at which the update is occurring).

At block 640, content-item presentation is influenced based on the user account data. For example, generation of or selection of a content item can be influenced. In one instance, a content item is generated or modified to include some of the collected. For example, a modified or generated content item can be modified to include a user's name, residential city and/or an interest of a user. In one instance, text or an image to be included in a content item is determined based on the account data. For example, a select product, a representative menu item, a discount amount, an opportunity date or date range (e.g., for a discount), and/or a recommended appointment or reservation time can be selected based on the data and pictorially or textually presented within a content item to the user.

Figure 7:
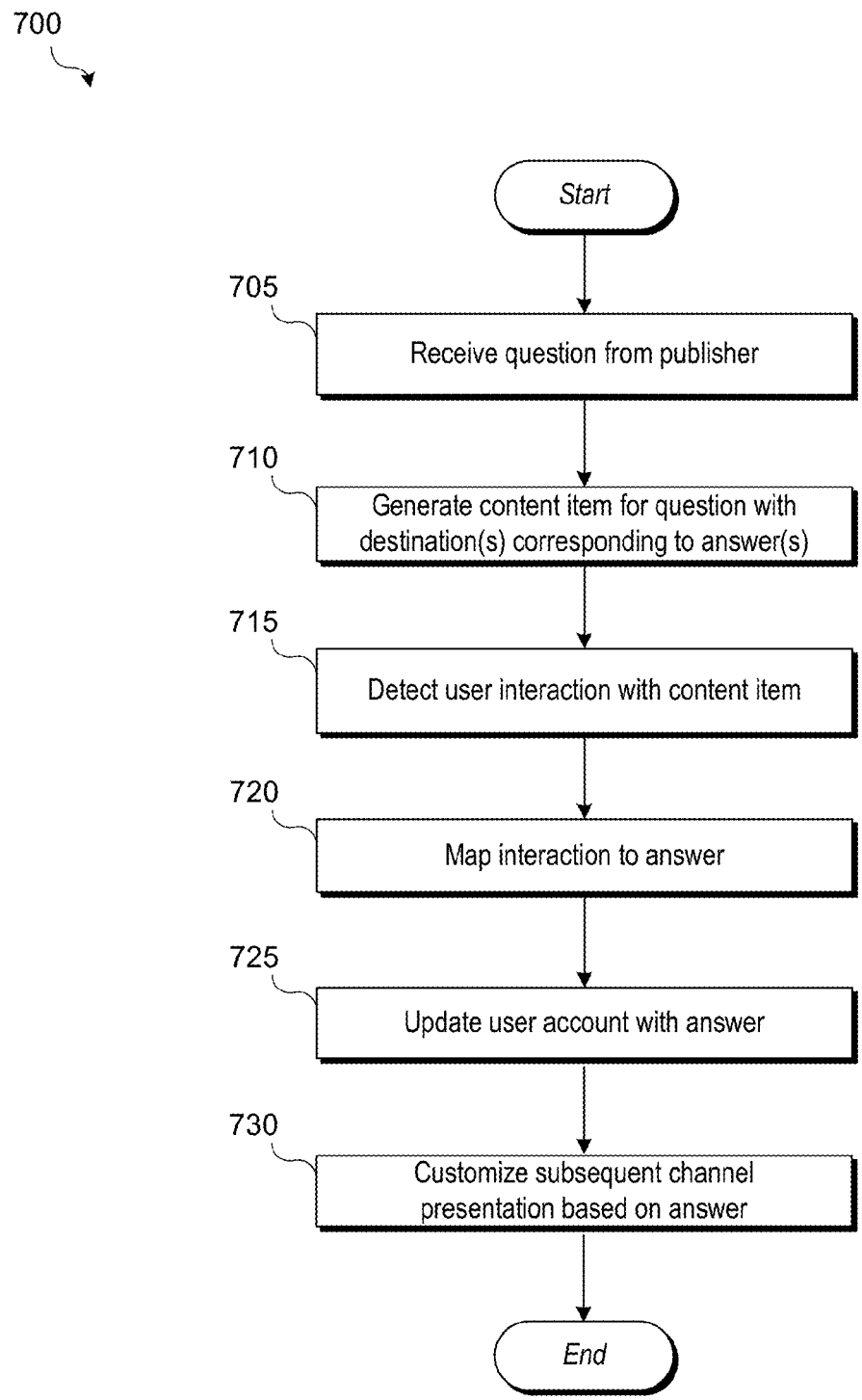
FIG. 7 shows flow diagram of a process for receiving information via a content-item interaction according to an embodiment of the invention.

FIG. 7 shows flow diagram of a process 700 for receiving information via a content-item interaction according to an embodiment of the invention. Part or all of process 700 can be performed by a user device, server, publisher device and/or electronic channel management system.

Process 700 begins at block 705 where a question is received from the publisher. The question can be one to pose to a user. The question can include one or more potential answers or answers may not be so constrained. A channel identifier can be received along with or otherwise associated with the question. In some instances, the question is received with or otherwise associated with a presentation condition, such as an identification of a characteristic of a user for which the question is suitable. The question can be of any form whereby information is requested. For example, the question may include a question mark or can include a request (e.g., please identify . . . ).

At block 710, a content item can be generated to include the question. For example, a visual presentation of the question can be added to a content-item template. In some instances, an identification of each of one or more potential answers is also presented. As one example, different potential answers can be presented in different portions of a screen, and an interaction associated with a particular portion can be associated with the corresponding answer. As another example, the content item can identify a particular interaction type associated with each potential answer. In some instances, information as to how an interaction is to be mapped to an answer is presented (e.g., "Click here if . . . ").

In one instance, the content item can indicate that a user can respond to a question by visiting a destination. For example, a content item can state: "Click here to provide details as to the pet(s) that you own." A corresponding action may direct a user device to a webpage where information can be provided. In some instances, the content item can indicate or it can otherwise be conveyed that interacting with the content item in a manner that provides an answer to a question will result in an award of a quantity of reward points. The reward points can be fixed, defined by a publisher, defined on a user characteristic (e.g., how frequently she has interacted with content items in the past, etc.).

The generated content item can be presented on one or more user devices, such as one, some or all devices of subscribers to a channel associated with the publisher. At block 715, user interaction with the content item is detected. The interaction can correspond to a request to visit a destination. The user interaction can correspond to receipt of input at a device of a user.

At block 720, the interaction can be mapped to an answer. In one instance, any interaction corresponds to a single answer. In one instance, any interaction associated with a particular interaction type (e.g., clicking on a content item) corresponds to a single answer. In one instance, an answer is determined at least in part by associating the interaction with a portion of the screen. In one instance, the answer is determined based on input provided after an initial interaction. For example, the initial interaction may direct a user device to a destination at which the answer can be identified by the user.

At block 725, an account associated with a device corresponding to the detected user interaction can be updated based on the answer. The updating can include identifying the question, identifying a field associated with the question and/or identifying the answer. The updating can further include identifying the publisher (and/or an associated channel) associated with the question. In some instances, the user answer it transmitted to or otherwise made accessible to the publisher. In some instances, answer data is collected for a set of users or devices and transmitted to or otherwise made accessible to the publisher.

At block 730, a subsequent channel presentation can be customized based on the answer. For example, a content-item generation and/or selection can be customized.

To illustrate, a publisher can be associated with a real-estate channel. The publisher can submit one or more house-searching questions, such as: "Click here if you are searching for a house near [auto-detected location]" or "Select a minimum number of bedrooms"; or "Visit our webpage to identify your house-searching budget goals". Answers can be identified for particular users, and real-estate data stores can be searched using the appropriate criteria. Content items for the real-estate channel that are presented to a user can be restricted to or focused to houses that meet the criteria as specified in answers provided by the user.

Figure 8:
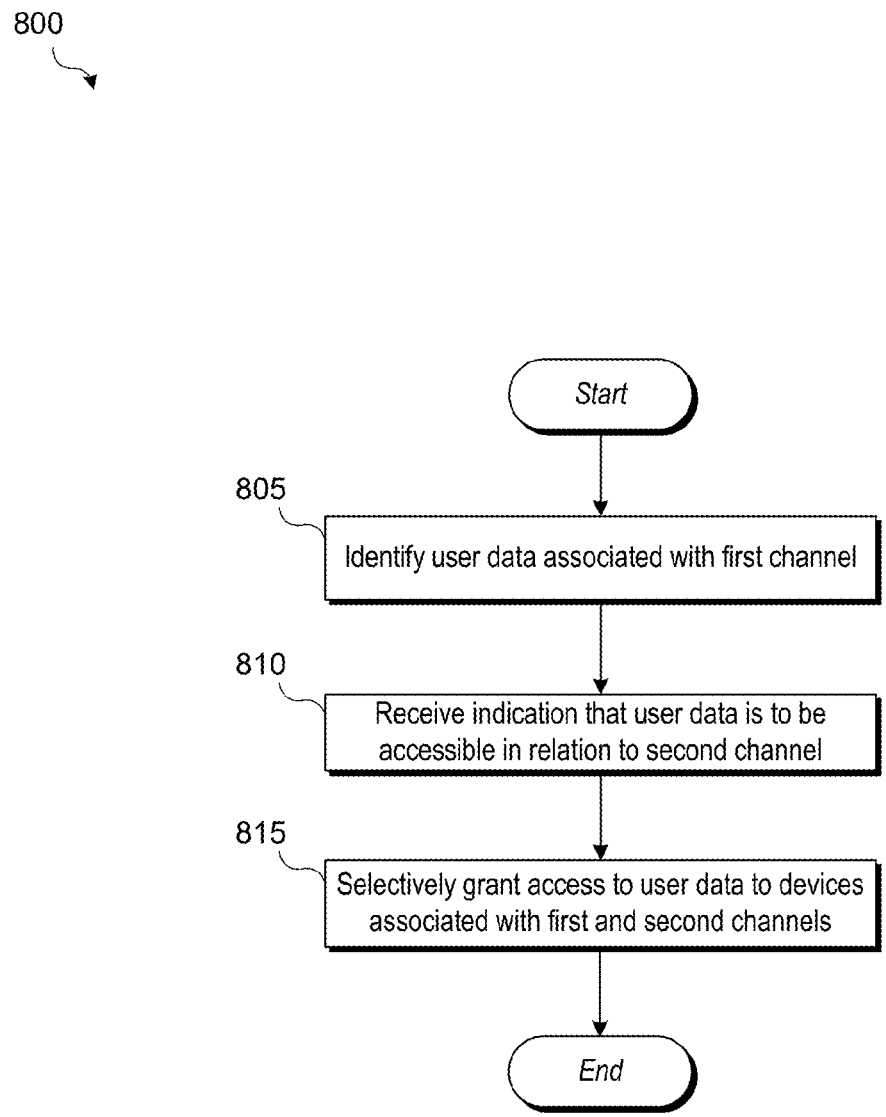
FIG. 8 shows flow diagram of a process for distributing user data according to an embodiment of the invention.

FIG. 8 shows flow diagram of a process 800 for distributing user data according to an embodiment of the invention. Part or all of process 800 can be performed by a user device, server, publisher device and/or electronic channel management system.

Process 800 begins at block 805 where user data associated with a first channel is identified. The user data can be associated with a first channel, for example, due to an entity of the first channel being at least partly responsible for collection of the data. For example, the first channel can be associated with data for which a merchant device corresponding to the first channel provided the data (e.g., indicating that the user was at a merchant location at a particular time). As another example, the first channel can be associated with data for which a publisher (or other entity) for the channel at least partly defined a question that, when presented, prompted the user to provide the data As yet another example, the first channel can be associated with data indicating that the user has or had an appointment with a merchant associated with the first channel at a particular time.

At block 810, an indication can be received that the user data is to be made accessible to an entity associated with a second channel. For example, two channels can be associated with a data-sharing relationship indicating that they are to share some or all user data associated with their channels. As another example, an entity associated with the second channel may pay the first channel for access. As yet another example, the first and second channels may be associated with a same publisher and/or merchant.

At block 815, access to the user data can be selectively granted to devices associated with the first and second channels. Thus, the user data need not be made available to all publishers or to devices associated with all channels. Granting access to the user data can include presenting the user data, transmitting the user data and/or availing the user data for searching. For example, granting access can include allowing a publisher to search for users with user data identifying a particular characteristic and/or allowing a publisher to identify a rule (e.g., for content-item generation and/or content-item selection) that depends on information in the user data.

A degree of access granted to devices of the two channels may be the same or may differ. For example, user names and/or other specific identifiers (e.g., email address, phone number and/or address) may be obscured or made unavailable to a device of the second channel but not to a device of a first channel. In some instances, the indication received at block 810 identifies specifics about the degree of access to be granted to the device of the second channel.

Figure 9:
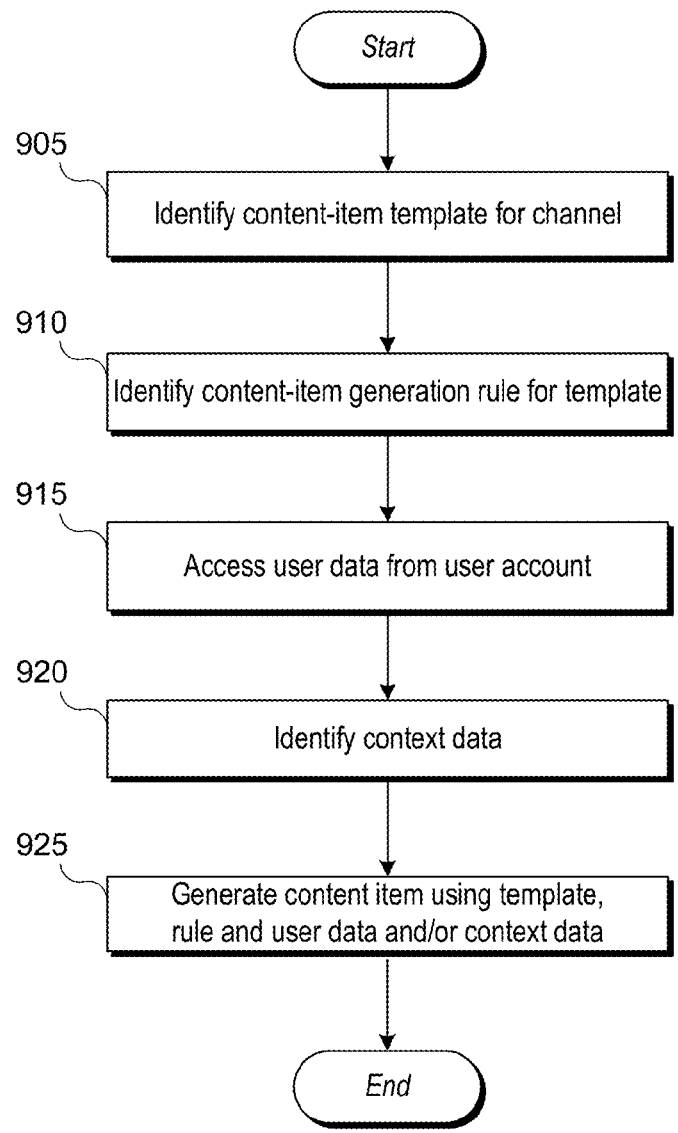
FIG. 9 shows flow diagram of a process for generating a custom channel content item according to an embodiment of the invention.

FIG. 9 shows flow diagram of a process 900 for generating a custom channel content item according to an embodiment of the invention. Part or all of process 900 can be performed by a user device, server, publisher device and/or electronic channel management system.

Process 900 begins at block 905 where a content-item template is identified for a channel. The template can include one uploaded by or selected by a publisher and/or a default template. The template can include, for example, a background, a channel identifier, one or more graphics, etc. In some instances, the template includes text and/or text with empty fields. The template can include one or more portions configured to be customized. A portion can be associated with a spatial or functional part of the content item. For example, a portion can include a part of a text to be customized, or a portion can include a geometric portion of a display to be customized.

To illustrate, a template content item can include: "[User name]—It is time to schedule an appointment for [pet's name]. Schedule before [date that is two days from now] for a [discount amount]% discount." The template content item can further include a portion of the item to show a picture of the pet.

At block 910, one or more content-item generation rules can be identified for the template. In some instances, the rule identifies how to identify data for a user and how to include the data in the template. For example, in the above example, the rule can identify account data that identifies the pet's name, and can associate such data with the field in the text "[pet's name]". In some instances, the rule identifies a selection to be made based on user data. For example, a discount amount can be 5% if a user's income is reported to be above $50,000 and 10% otherwise. In some instances, the rule identifies another type of relationship. For example, a rule can indicate that a number of pictorial people representations to be included in a content item is to be the same as a number of people reported to be in a user's family. In some instances, the rule can be associated with a template and/or is determined based on input received from a publisher (or other entity associated with the channel).

At block 915, user data from a user account is accessed. The user data can correspond to data used in the one or more identified rules.

At block 920, context data is identified. The context data can correspond to data used in the one or more identified rules. The context data can correspond to a context of a user (e.g., an identified near-term activity interest), a context of a user device (e.g., a location of the device), a general context (e.g., a current time), a context of a merchant location (e.g., a current menu option in over-supply), and so on.

At block 925, a content item can be generated using the template, rule and one or both of the user data and context data. For example, the rule can be evaluated using the user data and/or context data and the template can be supplemented based on the rule evaluation. The rule evaluation can include identifying content to add to the content item and/or identifying an arrangement of content on the content item.

The generated content item can be transmitted to and/or presented on a device (e.g., associated with the user data and/or context data).

Figure 10:
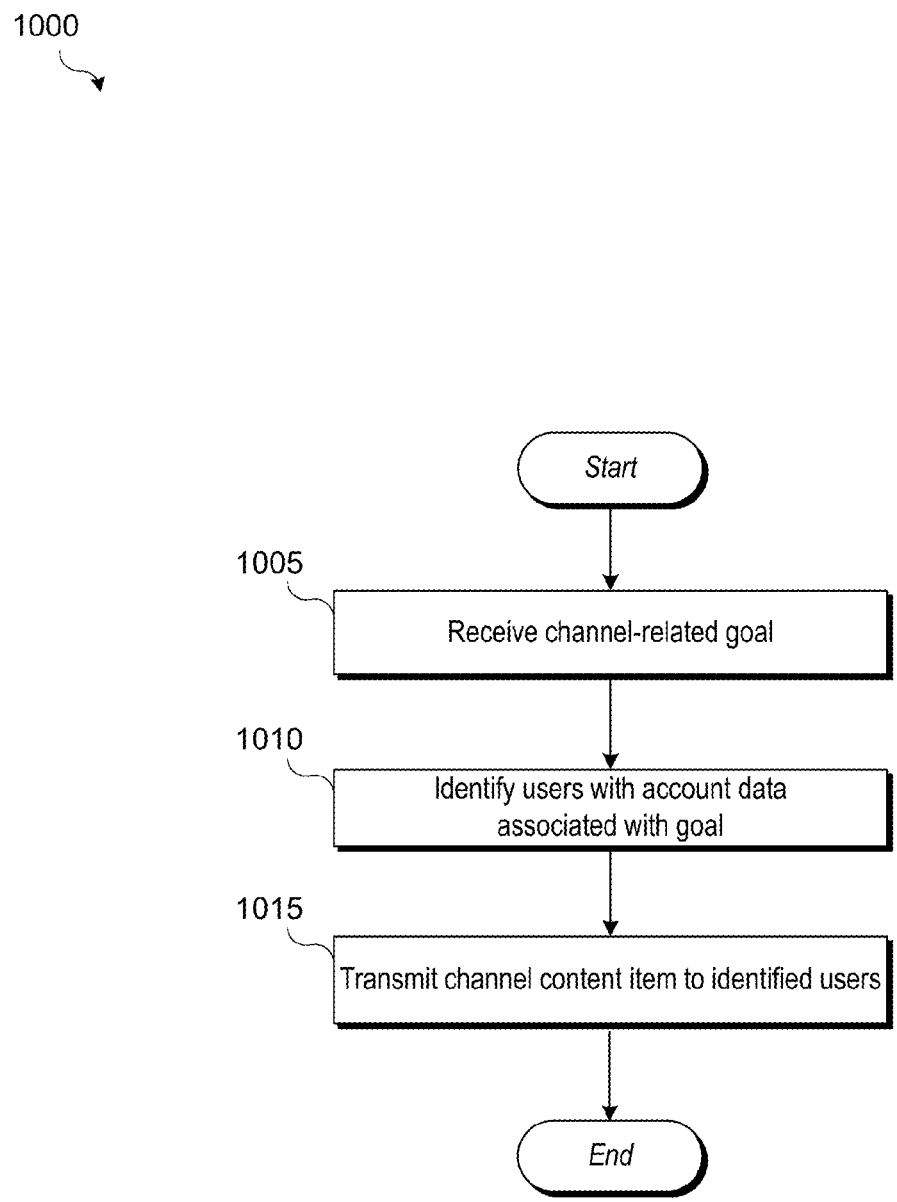
FIG. 10 shows flow diagram of a process for processing a publisher request using user account data according to an embodiment of the invention.

FIG. 10 shows flow diagram of a process 1000 for processing a publisher request using user account data according to an embodiment of the invention. Part or all of process 1000 can be performed by a user device, server, publisher device and/or electronic channel management system.

Process 1000 begins at block 1005 where a channel-related goal is received. The goal can include a virtual visitation goal (e.g., that 100 users select a channel destination to visit a webpage), physical visitation goal (e.g., that 40 people visit a particular retail location associated with a channel), sales goal (e.g., that 65 products or $500 of merchandise is sold), redemption goal (e.g., that 5 people redeem a channel discount item) and so on. The goal can be associated with a time period or time threshold. In some instances, the goal is associated with a conditional or unconditional payment (e.g., that already has been paid or will be paid if the goal is met).

At block 1010, one or more users can be identified based on their account data (e.g., which can include any information associated with a user, including current or past context data and current or past merchant-related data). The users can be identified as part of a search. For example, the search can include searching for users currently near or predicted to later be near a particular location (e.g., a prediction being made based on calendar events). The search can include searching for users who frequently redeem discount codes presented on channel content items. The search can include searching for users with a particular demographic characteristic and/or interest. A parameter of the search can depend on the goal and/or on information pertaining to the channel related to the goal (e.g., one or more merchant locations and/or a type of product or service being offered for sale). The search can be biased towards and/or restricted to subscribers of the channel and/or can include non-subscriber users. The search can be biased towards and/or restricted to users with devices currently in a display state and/or can include other users.

A number of users identified can depend on fixed, user-specific or channel-specific efficacy estimates. For example, it can be predicted that presentation of a non-discount content item will result in 5% of nearby users visiting a merchant location. If a goal is that 15 people visit the location, 300 users could be identified.

In some instances, information about the identified users is transmitted to a publisher of the channel or an entity that submitted the search. The information can include an identifier of each user, a name of each user, a current or predicted location of each user, etc. In some instances, some information about an identified user (e.g., their names) is not available to the receiving party unless the user is a subscriber to the channel.

At block 1015, one or more channel content items are transmitted to devices the identified users. Thus, in some embodiments, a device of each identified is the same, and in other embodiments, different content items can be sent (e.g., differing in a promotion, featured product or service, or identified merchant location). The content item(s) can be assigned a high priority such that the devices present them quickly. Thus, for example, the priority can cause a receiving device to present the item before any other item or before any other item in a channel. The content item(s) can be associated with a presentation time (or time period) or condition (e.g., within 50 feet from a merchant location).

The transmissions can be tracked. In some instances, further detail is monitored, such as for which and/or how many users, the item was presented and/or interacted with a specific or general manner. In some instances, a merchant-related characteristic is further tracked for each of one or more of the identified users. The merchant-related characteristic can include, for example, whether or which location a user visited, whether the user made a purchase, what was purchased, a purchase value, whether an appointment was made, etc. The tracked and/or monitored information can be transmitted to a channel publisher and/or entity that submitted the search. Thus, process 1000 represents one technique by which channel-related information can be used to assist in achieving a channel-related goal.

Figure 11:
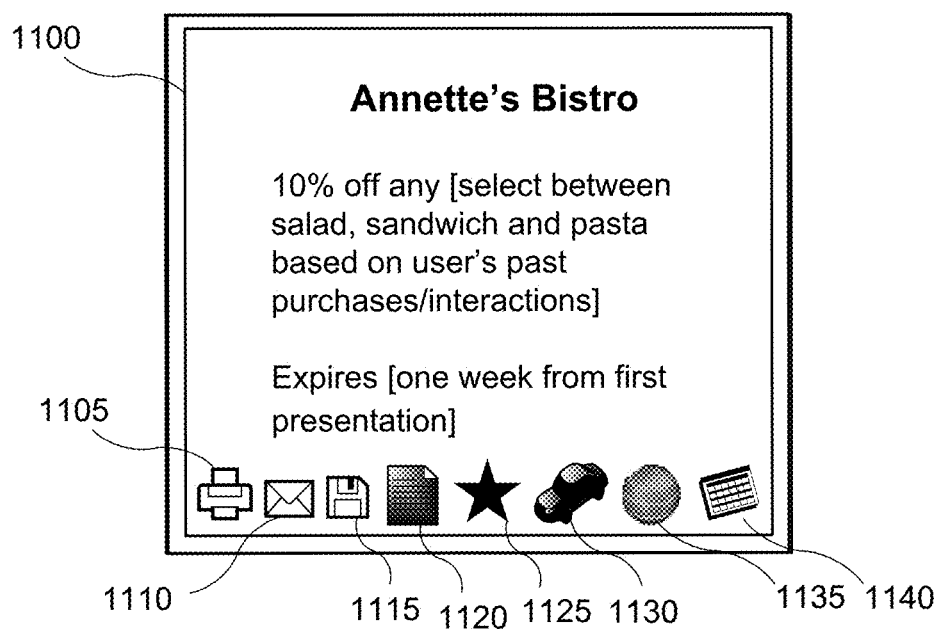
FIG. 11 shows an example of a template of content item that can be customized for a user or group of users according to an embodiment of the invention.

FIG. 11 shows an example of a template of content item 1100 that can be customized for a user or group of users according to an embodiment of the invention. In this example, the content item is for a channel of a particular restaurant and includes text identifying a discount.

The template includes two portions that can be customized (e.g., according to one or more rules associated with the template). First, the discount is to be applicable to one of: a salad, a sandwich and a pasta menu item. Which of these three is to be selected for the discount can depend on data associated with a particular user and/or device. Particularly, the selection in this example is to depend on a user's past purchases at a merchant location associated with the bistro and/or past interactions with content items from the channel. For example, the menu item selected may be the type that is most frequently ordered by the user or the type associated with content items most frequently interacted with.

Additionally, the content item does not include a fixed expiration date, but rather is to include one that is set based on a day that the content item is first presented to a user and/or on a user device.

A variety of potential actions are presented with the content items. The potential actions can include default potential actions and/or ones specifically associated with content item and/or channel. In the example in FIG. 11, each potential action is represented by an icon.

Three of the options in the depicted representation includes a printing option 1105, sharing option 1110 and saving option 1115. These can be, for example, default action options associated with all channel content items.

Selection of printing icon 1105 can cause a displayed content item to be printed (e.g., by opening a printing interface filled with default and modifiable printing information). Selection of sharing icon 1110 can present the user with options to send the content items to one or more other devices via, e.g., email, a social networking service, text message, etc. The user may then, or may have previously, entered login information for the user's email account or social networking account. The user can identify recipients by, e.g., name, email address, phone number, contact list, etc. The content item can then be sent and/or posted.

Selection of saving icon 1115 can cause the content item to be saved. For example, the content item may be saved to a local folder on the user's computing device. An interface may allow the subscriber to identify a name for the content item and/or a saving destination (e.g., folder), or a default naming convention and/or saving destination may be used. The user may then be able to locally retrieve the item. As another example, and/or an indication can be sent to a server that identifies the content item, as well as the subscriber and/or subscriber device. The user may then be able to request access to saved content items, and the server can send an indication as to which content items were saved for the particular user or device and/or may send one or more saved content items themselves.

The action options also include a view-menu option 1120, a view-reviews option 1125, a delivery option 1130, a locate option 1135 and a calendar option 1140. These options can apply to the channel in general, such that they are presented with all content items from the channel.

Selection of view-menu option 1120 can cause a menu to be displayed, where the menu is associated with a channel associated with displayed content item 1100. Thus, in this case, a menu for Annette's Bistro can be presented. In some instances, the menu is presented as a channel content item. In some instances, the device displays a webpage with the menu. The menu may, or may not, be interactive. The menu may be one corresponding to a time of day at which the option was selected. For example, a selection between a lunch or dinner menu may be made based on the time of the selection.

Selection of view-reviews option 1125 may identify an overall rating of the restaurant and/or specific reviews of the restaurant. The rating may be based on one or more user reviews and/or an estimated review of the user (e.g., based on past reviews from the user, a location of the user, channel selections made by the user, user preferences, etc.).

Selection of delivery option 1130 can cause an interface to be presented where a user can submit a delivery order. In some instances, delivery option 1130 and view-menu option 1120 are combined, such that selection of the combined option presents an interactive menu. In some instances, delivery option 1130 or another option is associated with the capability of placing an order for carry-out.

Selection of locate option 1135 can identify information (e.g., an address, phone numbers and/or hours) of one or more merchants associated with the channel. For example, Annette's Bistro may be a chain restaurant, associated with multiple locations. Selection of locate option 1135 can cause a location of the user device to be detected and a merchant location closest to the user device to be identified and presented on the user device.

Selection of a calendar option 1140 can allow a user to attempt to make a reservation at a merchant location associated with the channel. In one instance, selection of calendar option 1140 presents an interface whereby a user can identify requested reservation details (e.g., time, location and party size), and the user can be informed as to whether there is an available conforming reservation and whether the reservation is confirmed. In one instance, selection of calendar option 1140 presents information to the user as to what days and/or times have reservation openings. The user can then select an opening and make a reservation.

EXAMPLES

Example 1

A vet office is a publisher for a vet channel. A user subscribes to the channel by scanning a QR code in the office. The vet office sends its account data (e.g., including pet-identifying information) for that user to a channel service provider server. The vet office also maintains a calendar for appointments and links the calendar to its channel.

The vet office establishes a rule that a Reminder content item is to be presented one week before an appointment scheduled for the user. The content item is custom generated to include the appointment time and pet name. The Reminder is prioritized to appear at a top of a queue for the vet channel for the user when it is a week before the appointment.

Example 2

A clothing store is a publisher for a clothing channel. A user subscribes to the channel after searching for online retail clothing channels. Content items showcasing various pieces of clothing are transmitted to the user. A destination for each content item provides further detail and a purchasing opportunity for the piece of clothing.

Interactions corresponding to destination requests are tracked for the user. Clothing items that led to a purchase are highly weighted. Clothing items that the user visited the destination for but did not purchase are moderately weighted. Other clothing items are assigned a low weight. Clothing items are each characterized based on one or more factors (e.g., type of apparel, material, brand/designer, etc.). Channel items are then selected based on the presented clothing items' factors and weights, and the selected channel items are transmitted to a device of the user.

Example 3

A user is carrying a mobile device. It is 10 am and he is walking, not in his house. The user is subscribed to a coffee channel (that is associated with multiple merchant locations), and an entity associated with the channel uploads to a server a purchasing history for the user. It is determined that the user purchases a coffee 80% of the days between 9:30 am and 10:30 am. A merchant location nearest to a location of the mobile device is identified at the server and sent to the mobile device. The mobile device generates a custom channel content item using a template, where the generated content item identifies the merchant location and includes a one-day discount.

Example 4

A user is subscribed to a financial channel. As part of a subscription to the channel, the user identifies currently held stocks and stocks of interest. A template content item for the channel includes a rule whereby a screen is to be divided into a top portion for currently held stocks and a bottom portion for stocks of interest. Exact proportions of the portion are to depend on the relative number of currently held stocks and stocks of interest.

When a device of the user is about to enter a display state, it sends a request to a publisher device. The publisher device looks up current values of the currently held stocks and stocks of interest and generates a content item using the template to include the prices. The generated item is transmitted to the user device.

Example 5

A user is subscribed to a real-estate channel. A current location of a device of the user is detected. The location is determined to be in zip code 55555. A channel content item is generated that includes text: "Are you looking to purchase real estate in: Zip code 55555 or somewhere else?" Each of "Zip code 55555" and "somewhere else" can be associated with a destination. Clicking on "Zip code 55555" may not change a content item presented (such that the destination is a silent destination) but can cause data to be stored or transmitted reflecting the selection. Clicking on "somewhere else" can direct the device to a webpage where a user can identify one or more zip codes of interest.

Subsequently, content items with property offerings in the identified zip code can be selectively transmitted to a device of the user. If a user requests a destination for a given property, a webpage with additional information can be displayed. Further, one or more content items can request that the user identify additional requirements or preferences for a real-estate search, and requesting a destination can direct the user device to a webpage to identify search parameters (e.g., bedroom counts, type of property, maximum budget). Content items with property offerings in the zip code and matching the parameters can then be identified and transmitted to the user device. Each of the property content item can be presented along with an option to request an opinion of the property from a real estate agent or to schedule a viewing or the property. Selecting such option can cause a message with an identifier of the user to be transmitted to a party associated with the channel.

Example 6

A user is subscribed to a hair-salon channel. Every two weeks, a channel content item can be customized for a user to show upcoming available appointments. A salon calendar can be compared to a calendar of the user. Time slots with openings in both calendars can be identified. A list of the three soonest time slots can be included in a content item generated at a publisher device custom for the user and transmitted (e.g., via an intermediate channel-managing server) to a device of the user.

Example 7

A user is subscribed to a restaurant channel. Payment information associated with the user (e.g., a credit card number) is stored in an account for the user. A content item includes at least part of a menu item and a picture of each of one or more items. The item can be customized to highlight top-picks for the user (based on prior menu ordering) and to identify previously ordered items.

Each item is associated with an ordering option. A user can interact with the ordering option to select an order quantity for a given item and to identify any special instructions. The content item can also include a submit-purchase option. Selection of this option can cause the order to be transmitted to a channel-associated merchant, who can then prepare the order for delivery or pick-up (as specified based on another content-item option). The order can be transmitted along with the user's payment information, name and address.

A confirmation content item can be generated at a channel-management server to summarize the order and to identify an estimated delivery time (based on a current time and number of orders being processed at the merchant device).

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

What is claimed is:

1. A computer-implemented method, comprising:
   determining, at an electronic performing device that a plurality of inputs have been received, wherein the plurality of inputs corresponds to a request to subscribe to a plurality of channels, and wherein each input in the plurality of inputs is received using a graphical interface associated with an application on an electronic device;
   facilitating subscribing the electronic device to each channel in the plurality of channels, wherein subscribing the electronic device to the plurality of channels includes generating or updating a customized data structure that corresponds to the electronic device, wherein the customized data structure identifies one or more channels that the electronic device is subscribed to, wherein a subscription to each channel in the plurality of channels results in the electronic device executing the application on the electronic device to periodically receive content-item data for one or more content items specified by a publisher of the channel, wherein the content-item data corresponds to data including characteristics of the one or more content items, wherein first content-item data providing characteristics for first content items of a first channel specified by a first publisher is different from second content-item data providing characteristics for second content items of a second channel specified by a second publisher, wherein the one or more content items are presented on the electronic device while the electronic device is in a display state, and wherein the electronic device enters the display state after a threshold duration or type of inactivity has been detected;
   identifying, at the electronic performing device, a predicted future location of the electronic device using a calendar event identified in an electronic calendar associated with the electronic device, wherein the calendar event identifies an event location and an event time corresponding to the predicted future location;
   for each channel of the plurality of channels:
      determining whether a customization rule that specifies a manner in which to generate or select content items based on locations of and times until calendar events are applicable to the channel; and
      when it is determined that a customization rule that specifies a manner in which to generate or select content items based on locations of and times until calendar events are applicable to the channel:
         identifying, via content-item data, one or more characteristics specified by a publisher of the channel as corresponding to one or more content items of the channel, wherein the one or more characteristics comprise a particular characteristic associated with a location;

determining whether the particular characteristic corresponds to the predicted future location; and
when it is determined that the particular characteristic corresponds to the predicted future location:
generating or selecting a particular content item using the customization rule and the event time, wherein the particular content item relates to the predicted future location; and
enabling a series of content items to be presented on the electronic device when the electronic device is in the display state, wherein the series of content items includes the particular content item and a different content item corresponding to different content-item data specified by a different publisher.

2. The computer-implemented method of claim 1, wherein generating or selecting the particular content item includes: identifying a content-item template associated with the customization rule; and generating the particular content item using the template, the customization rule and the predicted future location.

3. The computer-implemented method of claim 1, wherein:
the electronic performing device includes a computing device remote from the electronic device; and
enabling the series of content items to be presented on the electronic device when the electronic device is in the display state includes transmitting the particular content item to the electronic device.

4. The computer-implemented method of claim 1, wherein:
the performing device includes the electronic device; and
enabling the series of content items to be presented on the electronic device when the electronic device is in the display state includes presenting the particular content item on the electronic device when the electronic device is in the display state.

5. The computer-implemented method of claim 1, wherein the customization rule identifies how to include at least part of the content-item data in the particular content item.

6. The computer-implemented method of claim 1, wherein the generation or selection is biased towards inclusion of content associated with the predicted future location.

7. The computer-implemented method of claim 1, wherein determining whether the particular characteristic corresponds to the predicted future location includes:
identifying a location of the calendar event; and
determining whether the channel is associated with another location near the location of the calendar event, wherein the particular characteristic of the content-item data includes the other location.

8. The computer-implemented method of claim 1, wherein the calendar event includes an appointment.

9. The computer-implemented method of claim 1, wherein calendar data associated with the electronic calendar is stored locally in a data store at the electronic performing device, and wherein identifying the predicted future location includes retrieving the calendar data from the data store.

10. The computer-implemented method of claim 1, further comprising:
determining that the calendar event is associated with the channel;
in response to determining that the calendar event is associated with the channel, introducing a content-item selection bias, such that content items associated with the channel are more likely to be presented on the electronic device than are content items associated with the different channel; and
selecting content items to be included in the series of content items, wherein the selection includes selecting each of the particular content item and the different content item from amongst a set of previously received content items.

11. The computer-implemented method of claim 1, further comprising determining a time period until a time of a next calendar event, wherein the generation or selection is biased based on the time period.

12. The computer-implemented method of claim 1, wherein the electronic device enters the display state upon detecting that input has not been received for a defined period of time.

13. The computer-implemented method of claim 1, further comprising:
defining a sequence for the series of content items, wherein the sequence is influenced by the determination as to whether the particular characteristic corresponds to the predicted future location, and wherein, when it is determined that the particular characteristic corresponds to the predicted future location, the sequence indicates that the particular content item is to be presented before the different content item.

14. A system, comprising:
one or more data processors; and
a non-transitory computer readable storage medium containing instructions which when executed on the one or more data processors, cause the one or more data processors to perform actions including:
determining that a plurality of inputs have been received, wherein the plurality of inputs corresponds to a request to subscribe to a plurality of channels, and wherein each input in the plurality of inputs is received using a graphical interface associated with an application on an electronic device;
facilitating subscribing the electronic device to each channel in the plurality of channels, wherein subscribing the electronic device to the plurality of channels includes generating or updating a customized data structure that corresponds to the electronic device, wherein the customized data structure identifies one or more channels that the electronic device is subscribed to, wherein a subscription to each channel in the plurality of channels results in the electronic device executing the application on the electronic device to periodically receive content-item data for one or more content items specified by a publisher of the channel, wherein the content-item data corresponds to data including characteristics of the one or more content items, wherein a first content-item data providing characteristics for first content items of a first channel specified by a first publisher is different from a second content-item data providing characteristics for second content items of a second channel specified by a second publisher, wherein the one or more content items are presented on the electronic device while the electronic device is in a display state, and wherein the electronic device enters the display state after a threshold duration or type of inactivity has been detected;
identifying a predicted future location of the electronic device using a calendar event identified in an electronic calendar associated with the electronic device, wherein the calendar event identifies an event location and an event time corresponding to the predicted future location;
for each channel of the plurality of channels:

determining whether a customization rule that specifies a manner in which to generate or select content items based on locations of and times until calendar events are applicable to the channel; and when it is determined that a customization rule that specifies a manner in which to generate or select content items based on locations of and times until calendar events are applicable to the channel:

identifying, via content-item data, one or more characteristics specified by a publisher of the channel as corresponding to one or more content items of the channel, wherein the one or more characteristics comprise a particular characteristic associated with a location;

determining whether the particular characteristic corresponds to the predicted future location; and when it is determined that the particular characteristic corresponds to the predicted future location:

generating or selecting a particular content item using the customization rule and the event time, wherein the particular content item relates to the predicted future location; and enabling a series of content items to be presented on the electronic device when the electronic device is in the display state, wherein the series of content items includes the particular content item and a different content item corresponding to different content-item data specified by a different publisher.

15. The system of claim 14, wherein generating or selecting the particular content item includes: identifying a content-item template associated with the customization rule; and generating the particular content item using the template, the customization rule and the predicted future location.

16. The system of claim 14, wherein the customization rule identifies how to include at least part of the content-item data in the particular content item.

17. The system of claim 14, wherein the generation or selection is biased towards inclusion of content associated with the predicted future location.

18. A computer-program product tangibly embodied in a non-transitory machine-readable storage medium, including instructions configured to cause one or more data processors to perform actions including:

determining that a plurality of inputs have been received, wherein the plurality of inputs corresponds to a request to subscribe to a plurality of channels, and wherein each input in the plurality of inputs is received using a graphical interface associated with an application on an electronic device;

facilitating subscribing the electronic device to each channel in the plurality of channels, wherein subscribing the electronic device to the plurality of channels includes generating or updating a customized data structure that corresponds to the electronic device, wherein the customized data structure identifies one or more channels that the electronic device is subscribed to, wherein a subscription to each channel in the plurality of channels results in the electronic device executing the application on the electronic device to periodically receive content-item data for one or more content items specified by a publisher of the channel, wherein the content-item data corresponds to data including characteristics of the one or more content items, wherein a first content-item data providing characteristics for first content items of a first channel specified by a first publisher is different from second content-item data providing characteristics for second content items of a second channel specified by a second publisher, wherein the one or more content items are presented on the electronic device while the electronic device is in a display state, and wherein the electronic device enters the display state after a threshold duration or type of inactivity has been detected;

identifying a predicted future location of the electronic device using a calendar event identified in an electronic calendar associated with the electronic device, wherein the calendar event identifies an event location and an event time corresponding to the predicted future location;

for each channel of the plurality of channels:

determining whether a customization rule that specifies a manner in which to generate or select content items based on locations of and times until calendar events are applicable to the channel; and when it is determined that a customization rule that specifies a manner in which to generate or select content items based on locations of and times until calendar events are applicable to the channel:

identifying, via content-item data, one or more characteristics specified by a publisher of the channel as corresponding to one or more content items of the channel, wherein the one or more characteristics comprise a particular characteristic associated with a location;

determining whether the particular characteristic corresponds to the predicted future location; and when it is determined that the particular characteristic corresponds to the predicted future location:

generating or selecting a particular content item using the customization rule and the event time, wherein the particular content item relates to the predicted future location; and enabling a series of content items to be presented on the electronic device when the electronic device is in the display state, wherein the series of content items includes the particular content item and a different content item corresponding to different content-item data specified by a different publisher.

19. The computer-program product of claim 18, wherein generating or selecting the particular content item includes: identifying a content-item template associated with the customization rule; and generating the particular content item using the template, the customization rule and the predicted future location.

20. The computer-program product of claim 18, wherein the generation or selection is biased towards inclusion of content associated with the predicted future location.

\* \* \* \* \*